Nov. 8, 1932.                    M. G. DE SIMONE                    1,887,258
                                 CALCULATING MACHINE
                              Filed June 12, 1926    15 Sheets-Sheet 1

INVENTOR,
Michele G. de Simone,
BY
Henry J. Lucke,
ATTORNEY

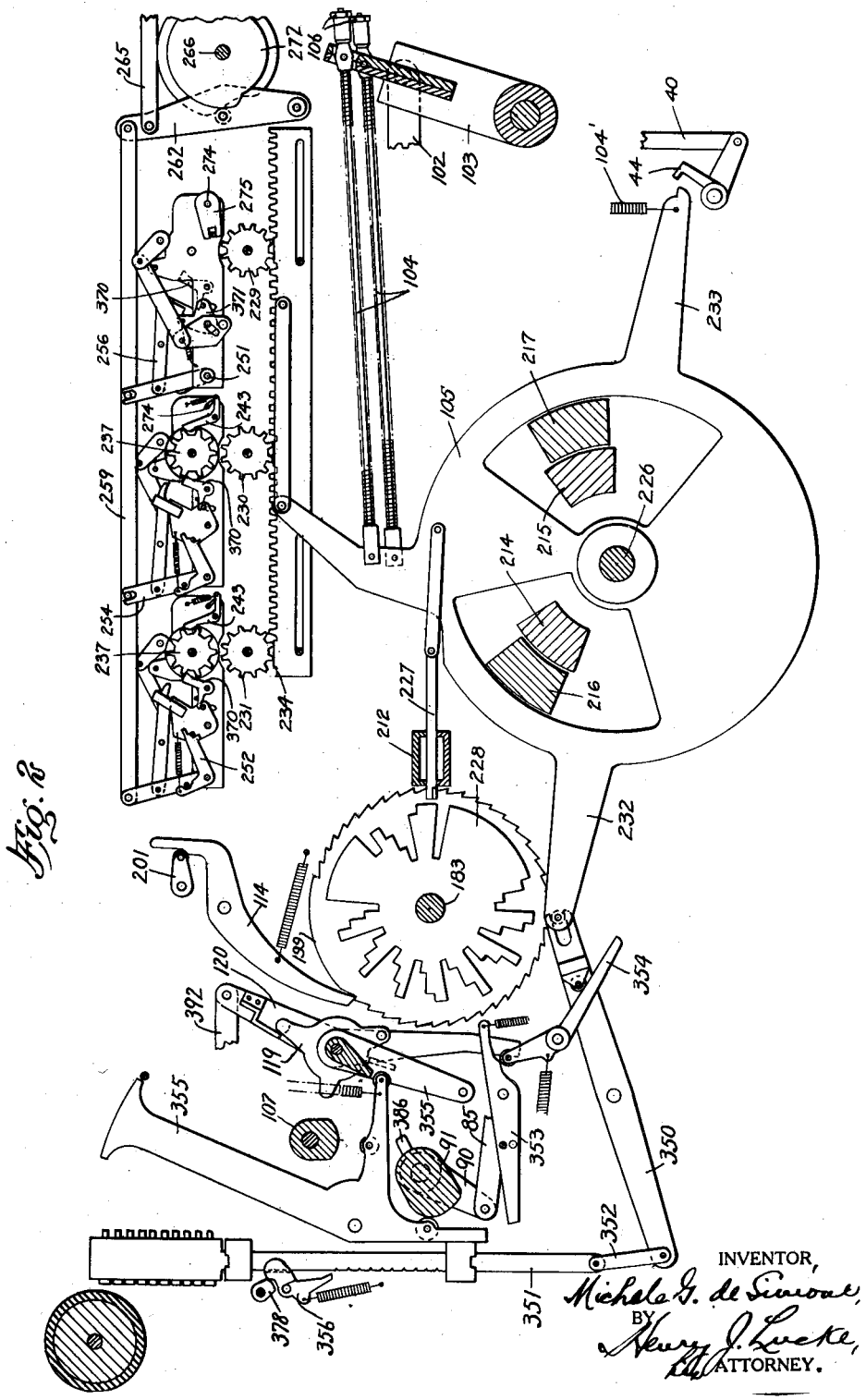

Nov. 8, 1932.  M. G. DE SIMONE  1,887,258
CALCULATING MACHINE
Filed June 12, 1926   15 Sheets-Sheet 3
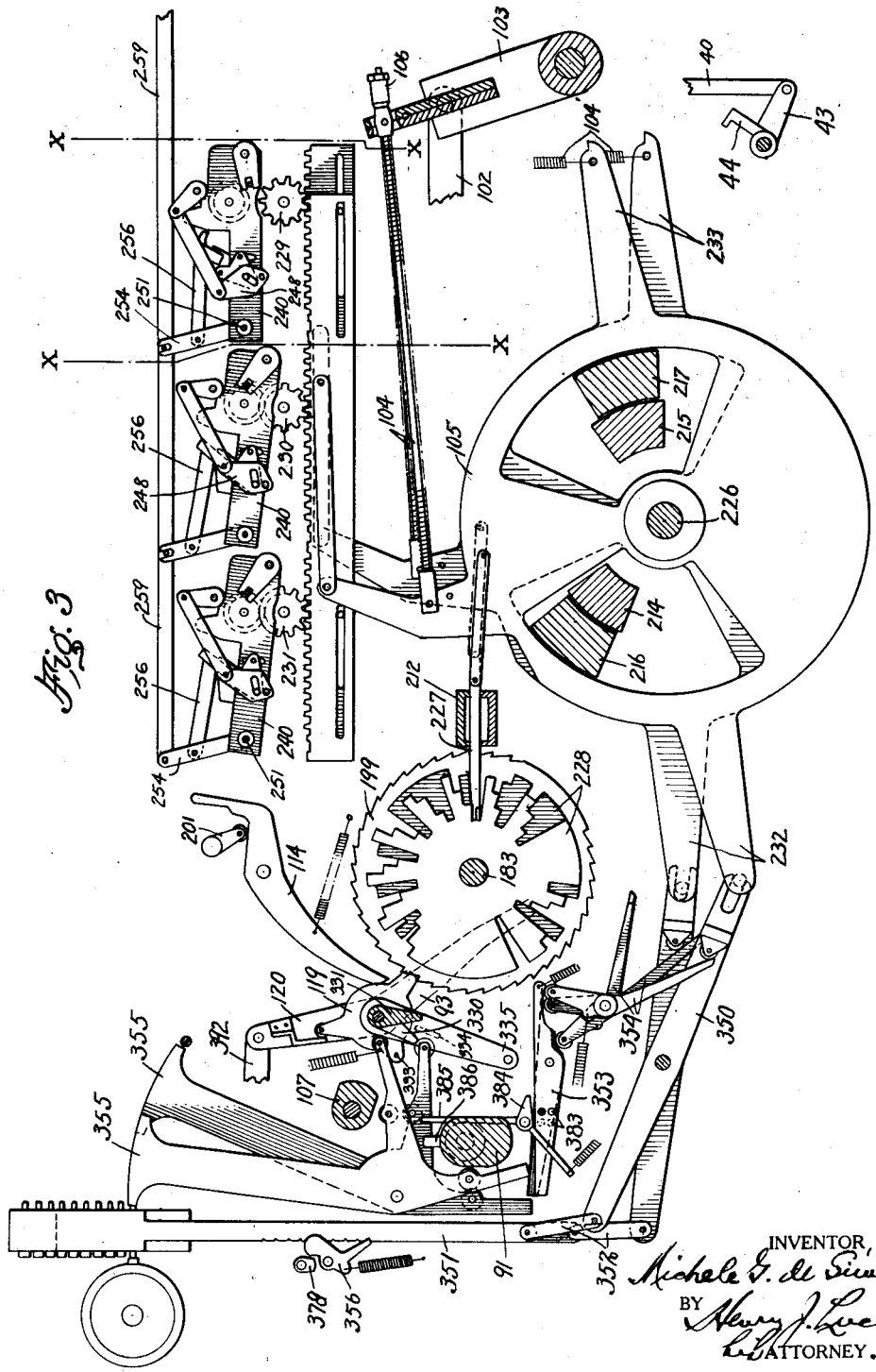

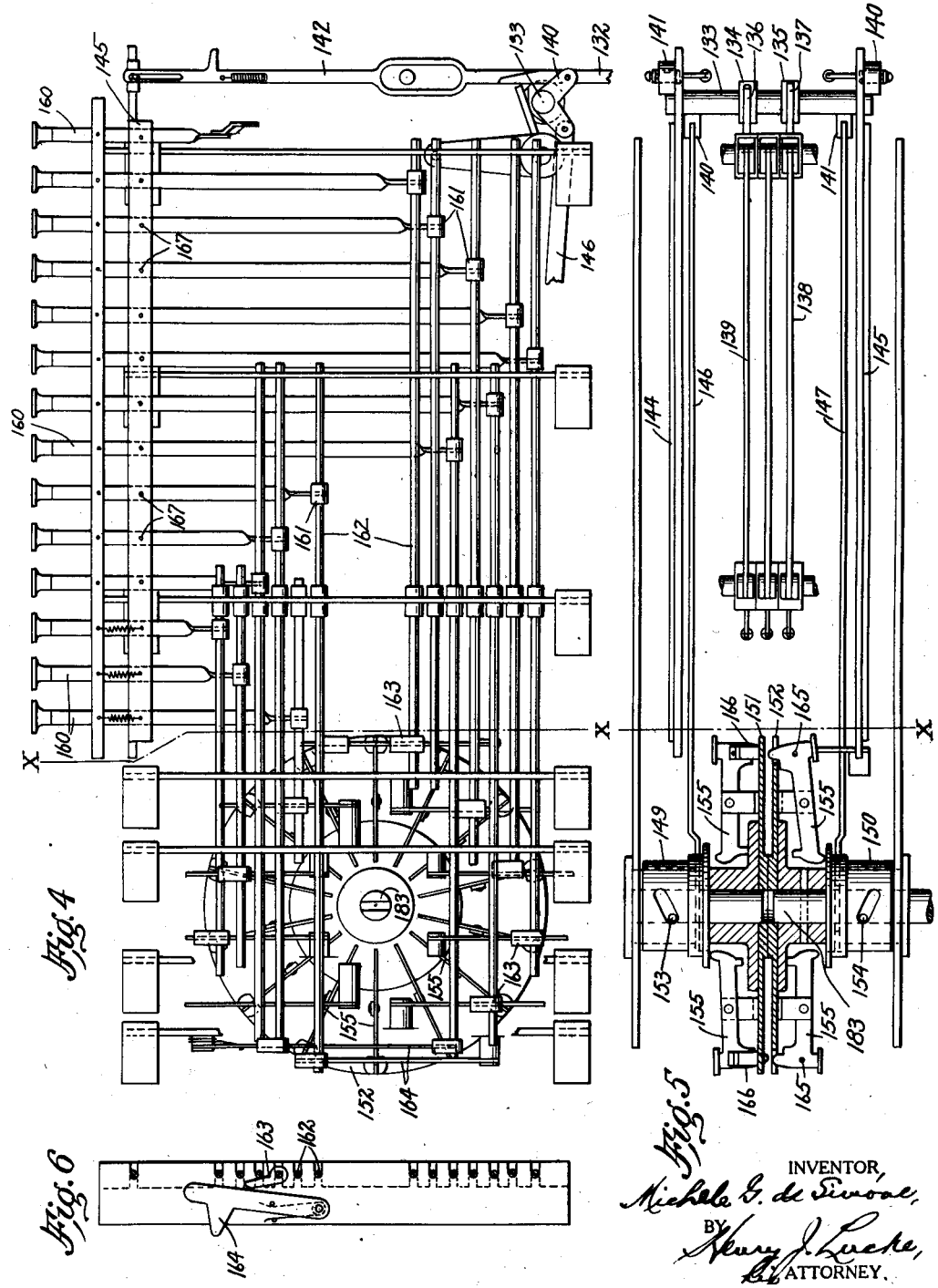

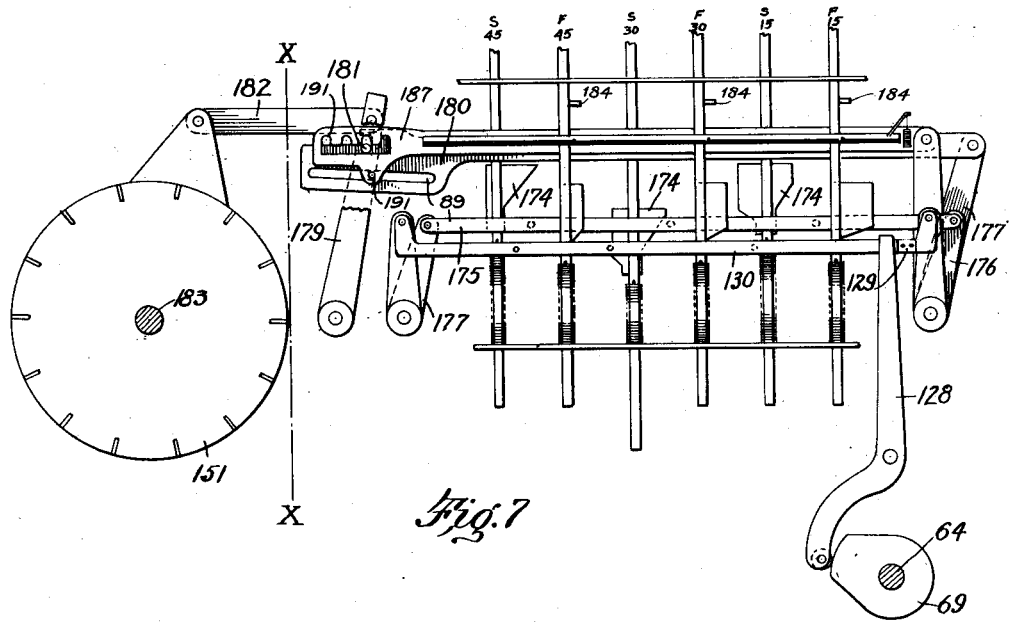
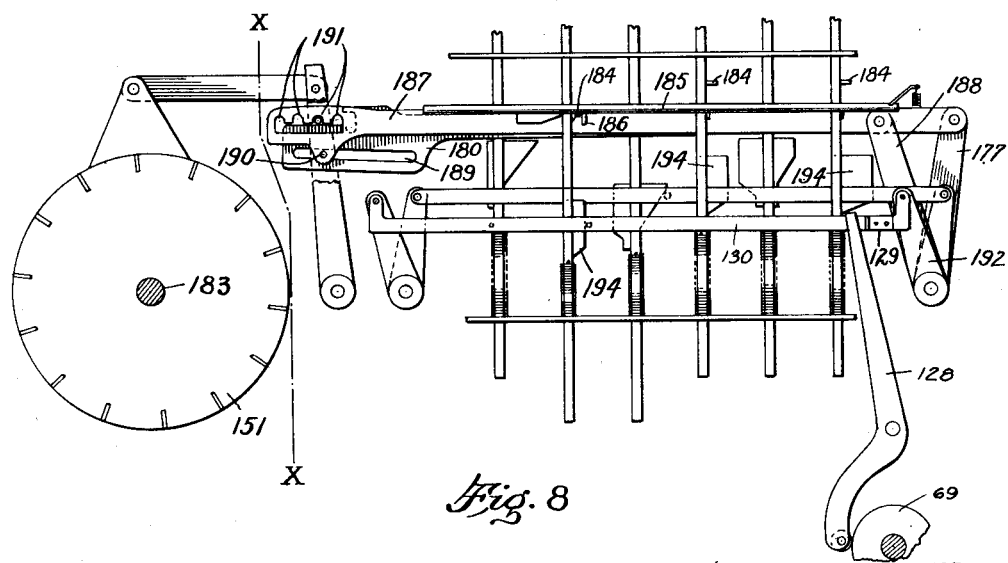

Nov. 8, 1932.  M. G. DE SIMONE  1,887,258
CALCULATING MACHINE
Filed June 12, 1926  15 Sheets-Sheet 6
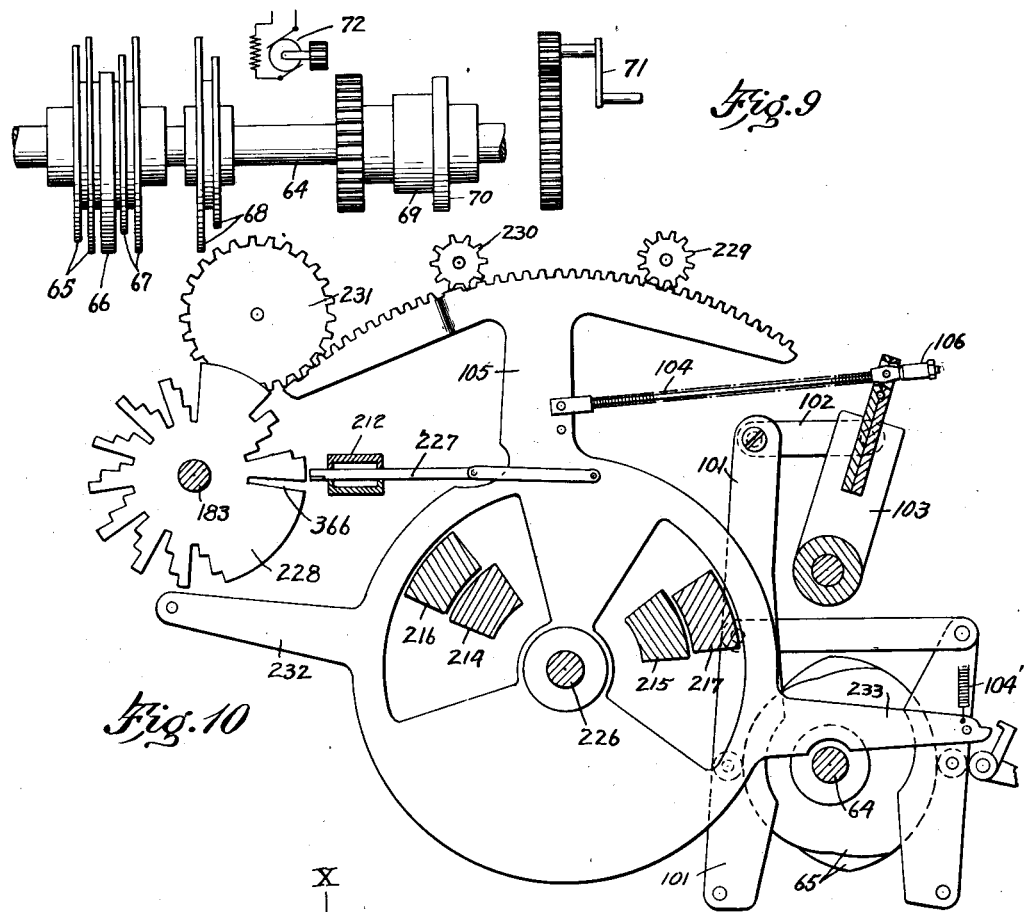
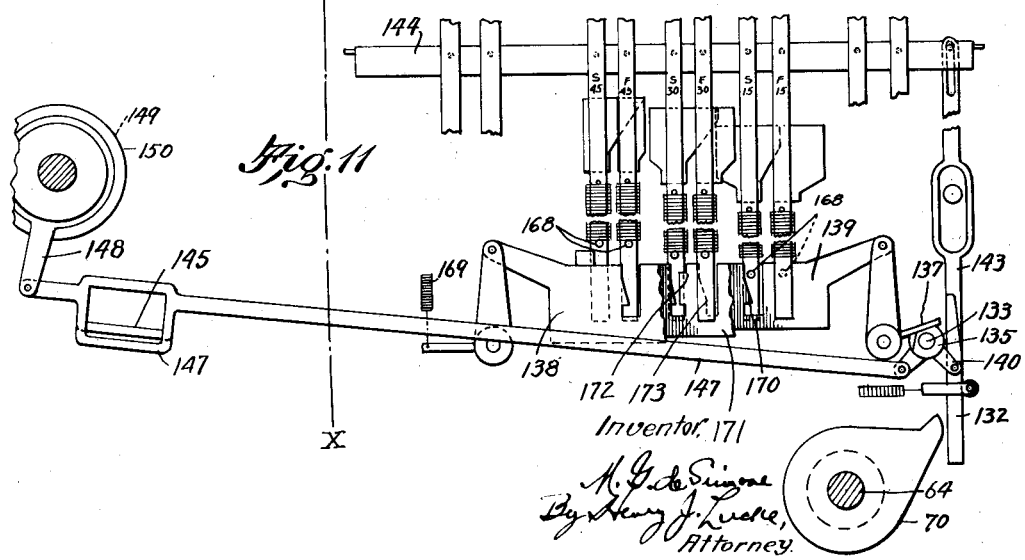

Nov. 8, 1932.    M. G. DE SIMONE    1,887,258
CALCULATING MACHINE
Filed June 12, 1926    15 Sheets-Sheet 7
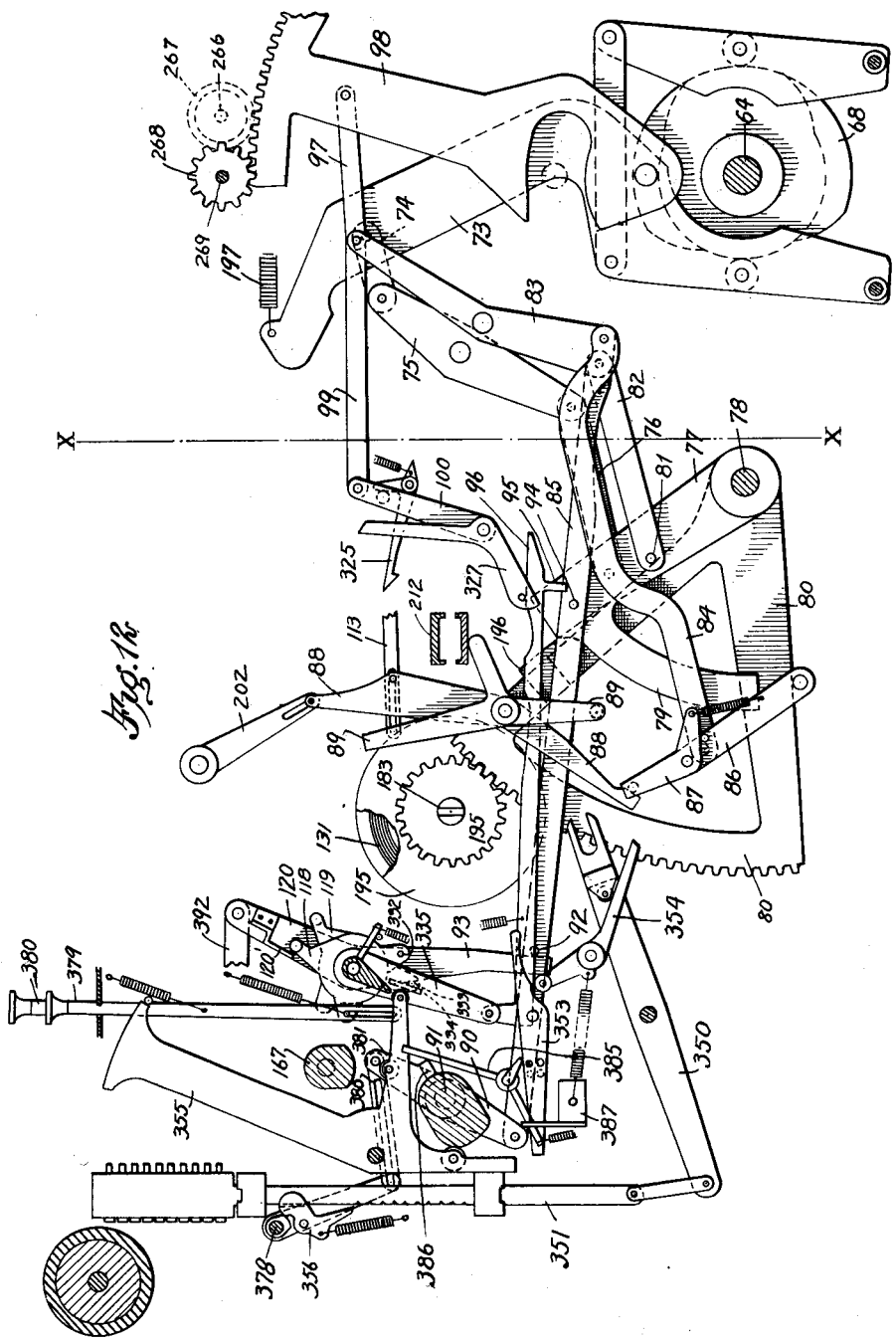

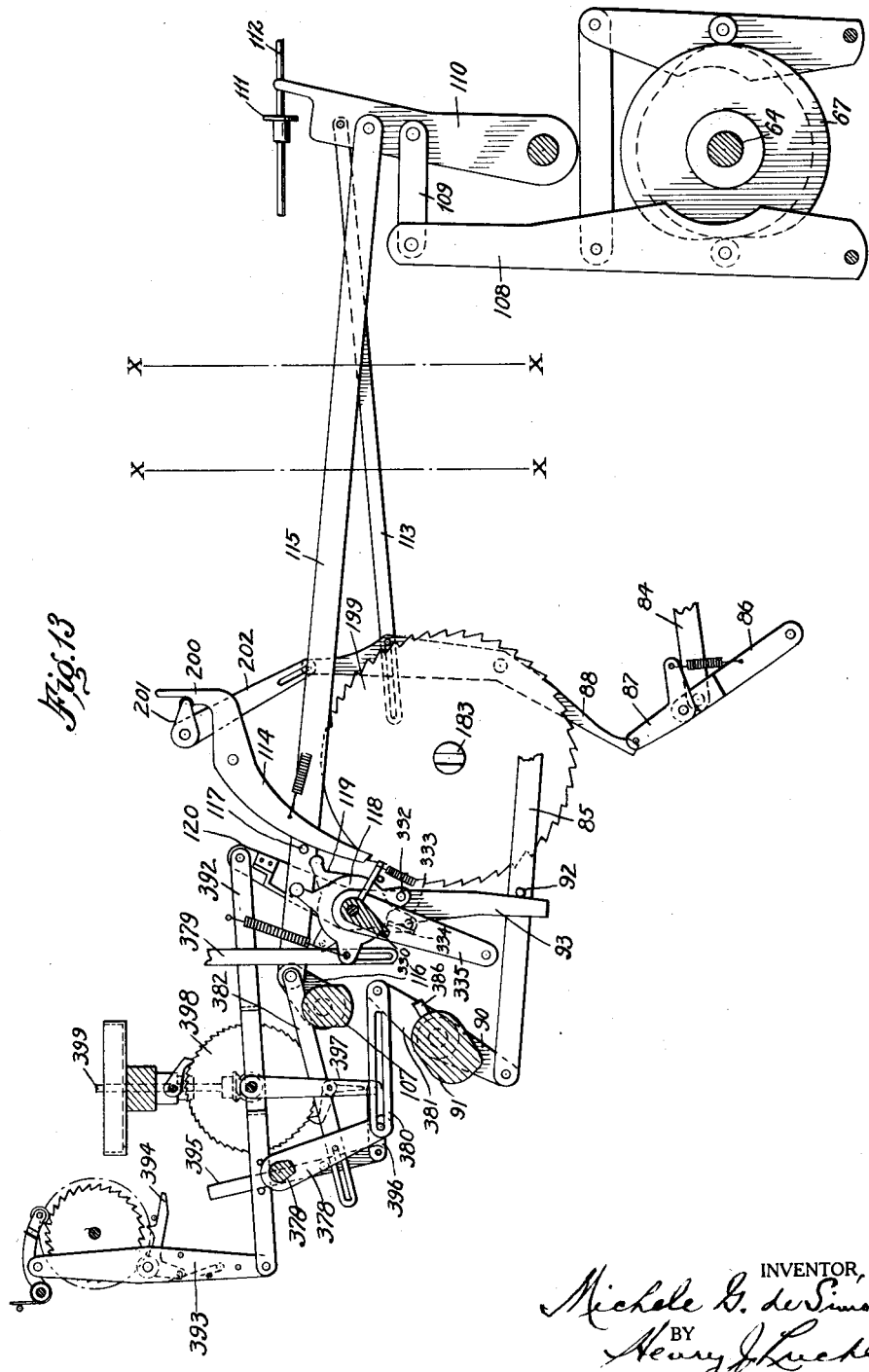

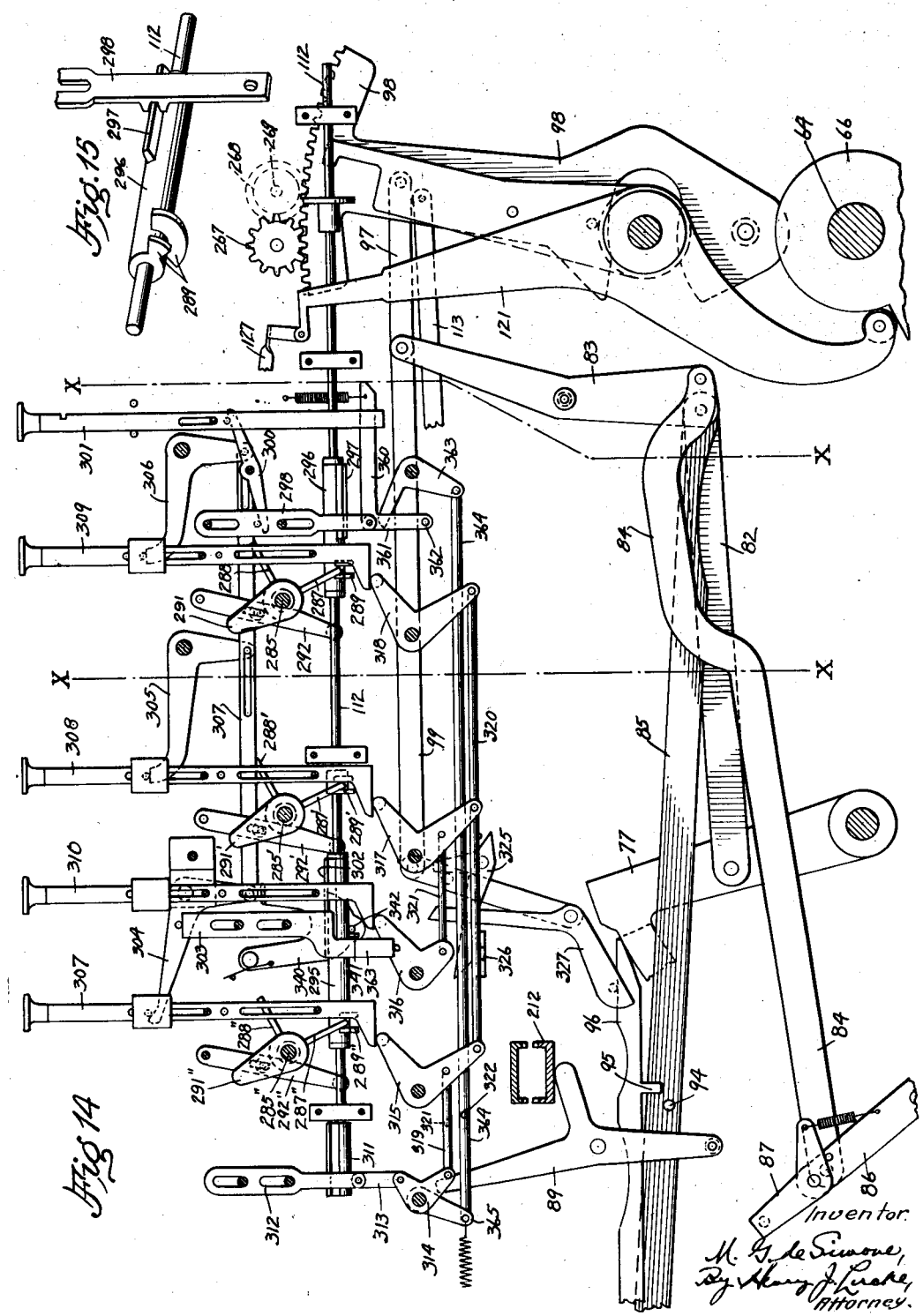

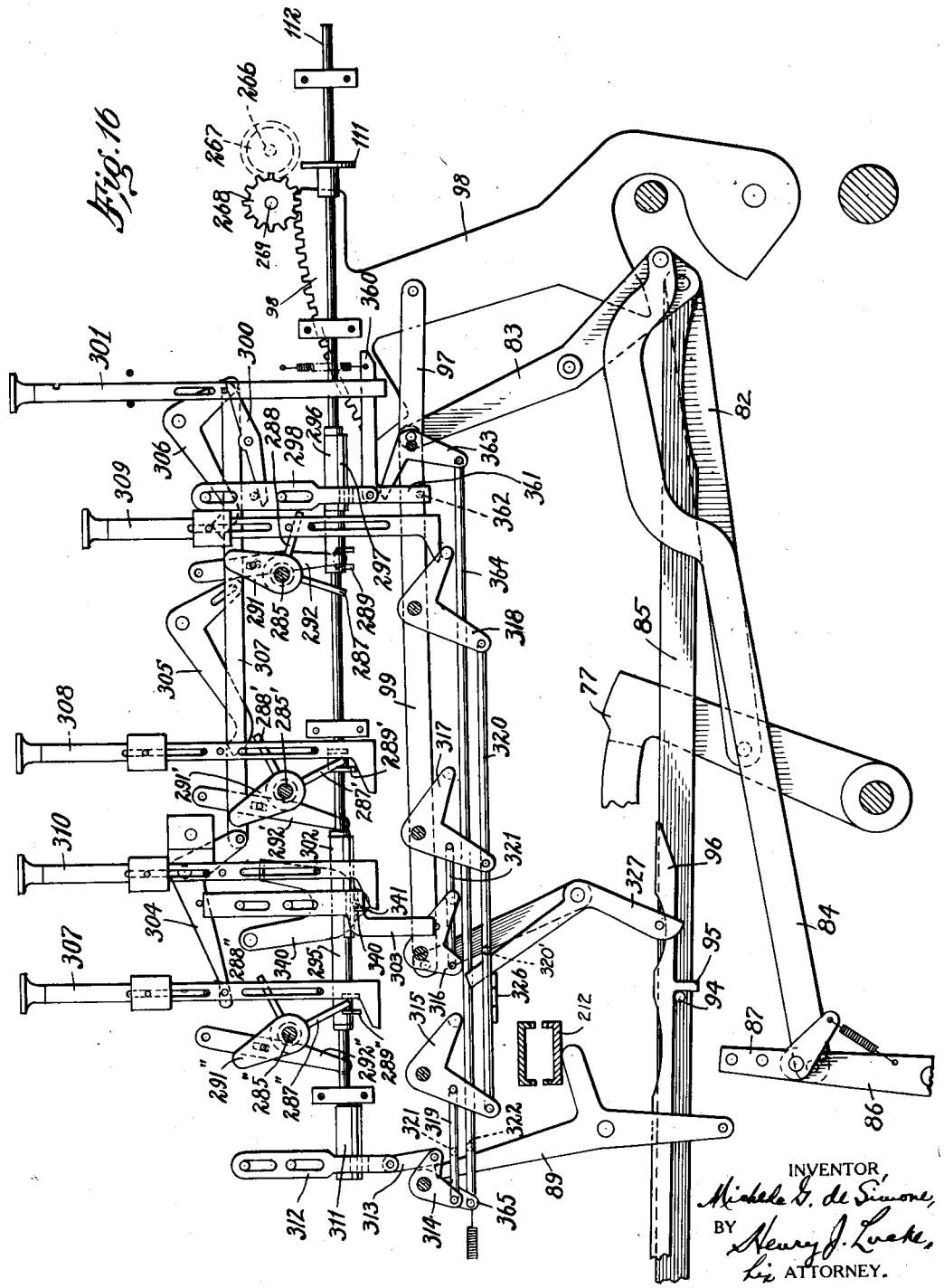

Nov. 8, 1932.  M. G. DE SIMONE  1,887,258
CALCULATING MACHINE
Filed June 12, 1926  15 Sheets-Sheet 11
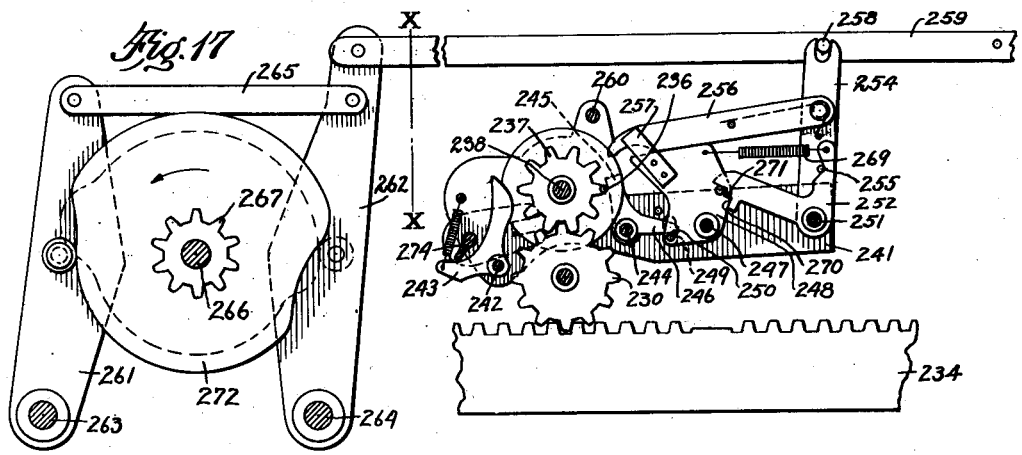
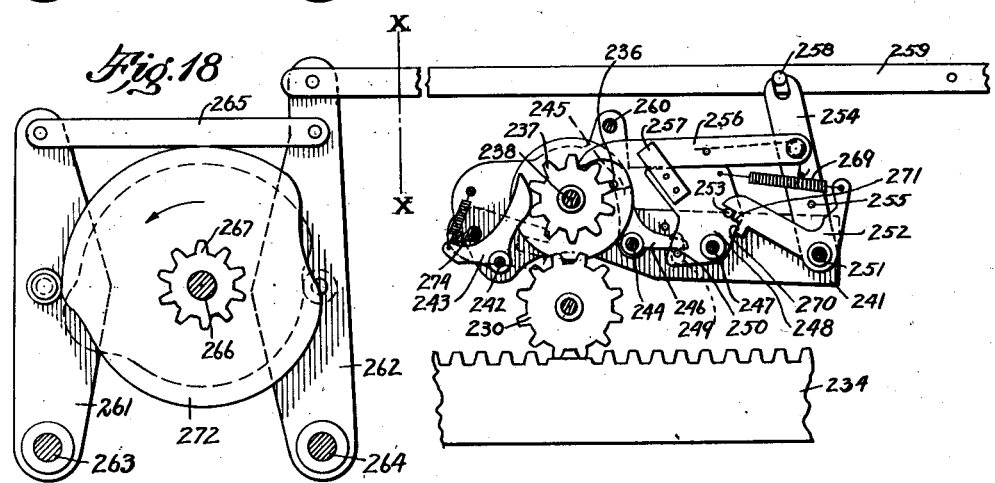
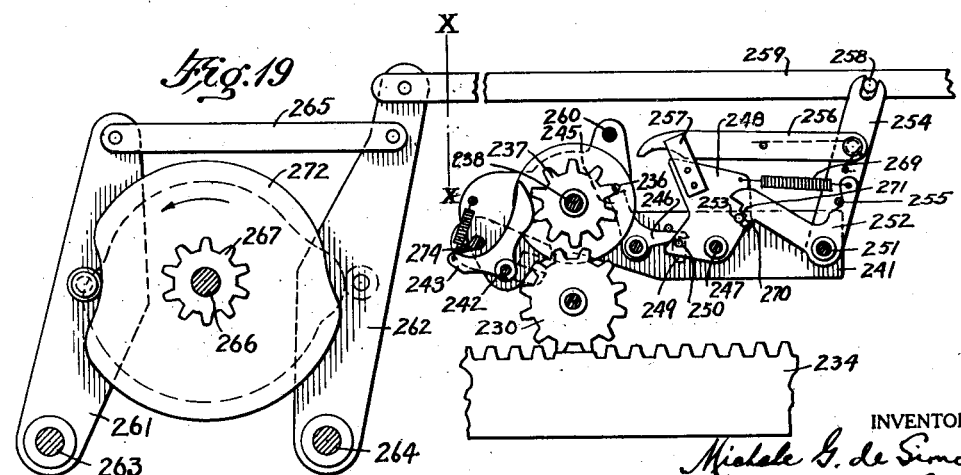
INVENTOR,
Michele G. de Simone,
BY Henry J. Lucke,
ATTORNEY.

Nov. 8, 1932.　　M. G. DE SIMONE　　1,887,258
CALCULATING MACHINE
Filed June 12, 1926　　15 Sheets-Sheet 12
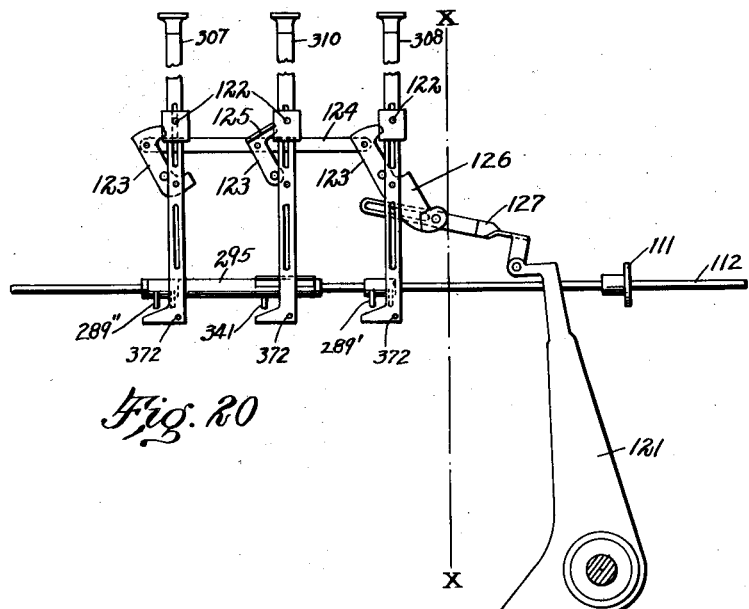
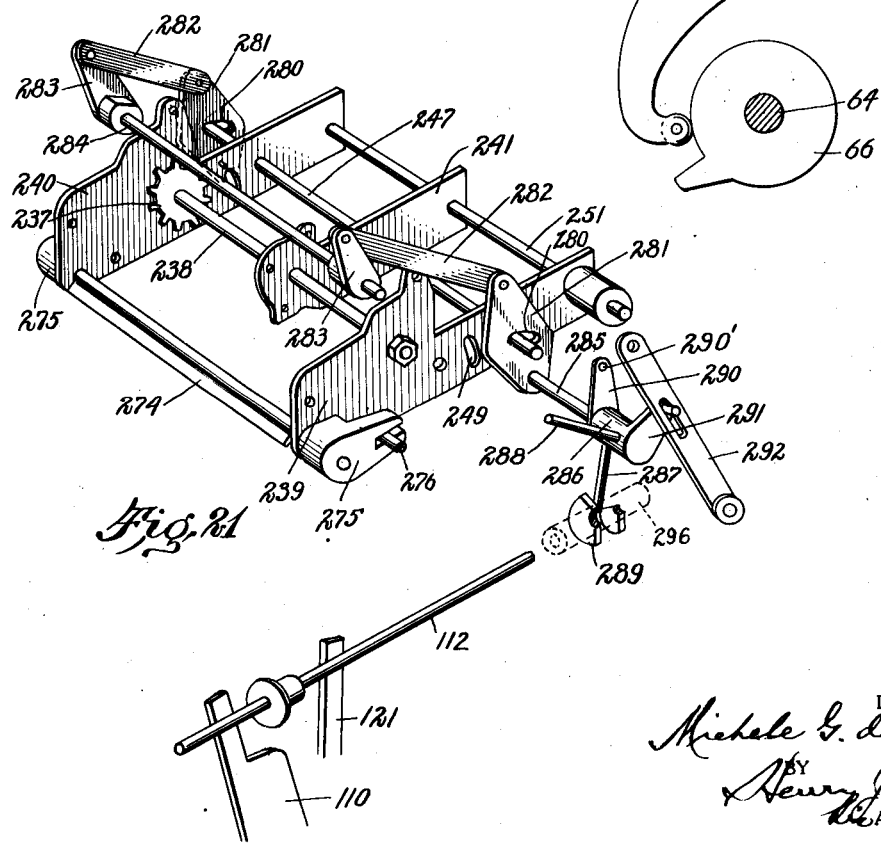

Nov. 8, 1932.  M. G. DE SIMONE  1,887,258
CALCULATING MACHINE
Filed June 12, 1926   15 Sheets-Sheet 13
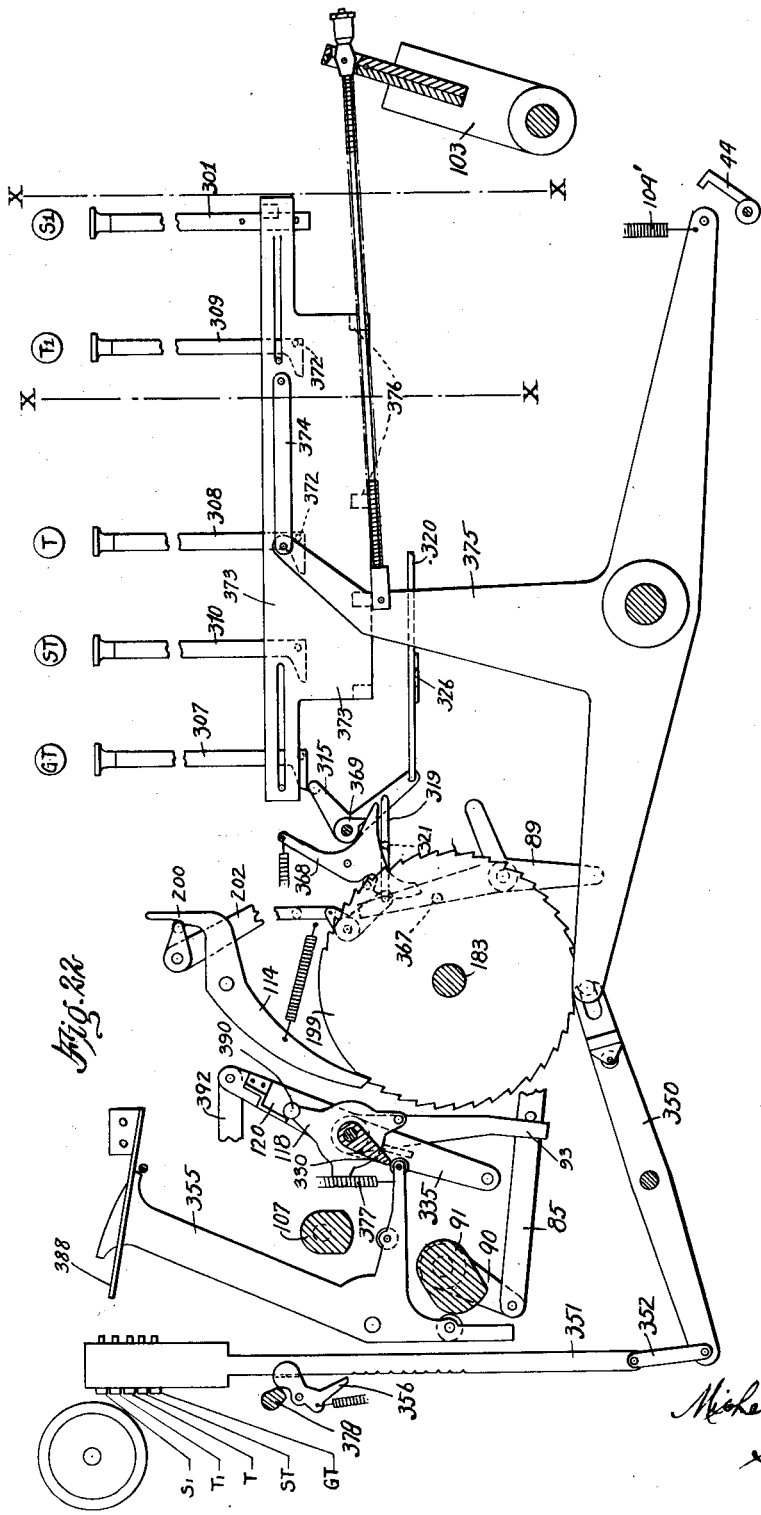
INVENTOR,
Michele G. de Simone,
BY Henry J. Lucke,
ATTORNEY.

Nov. 8, 1932.   M. G. DE SIMONE   1,887,258
CALCULATING MACHINE
Filed June 12, 1926   15 Sheets-Sheet 14
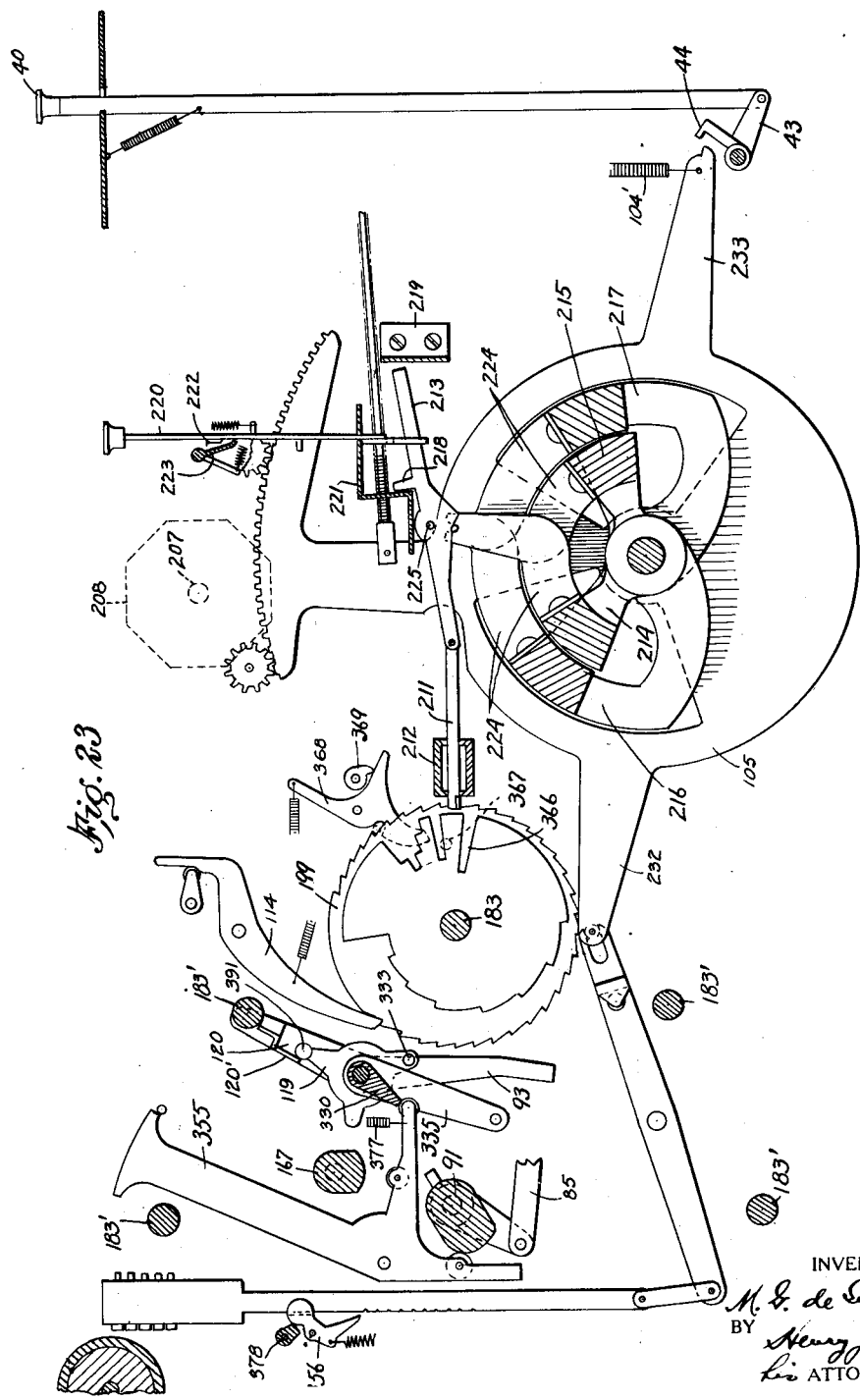

Nov. 8, 1932.  M. G. DE SIMONE  1,887,258
CALCULATING MACHINE
Filed June 12, 1926  15 Sheets-Sheet 15
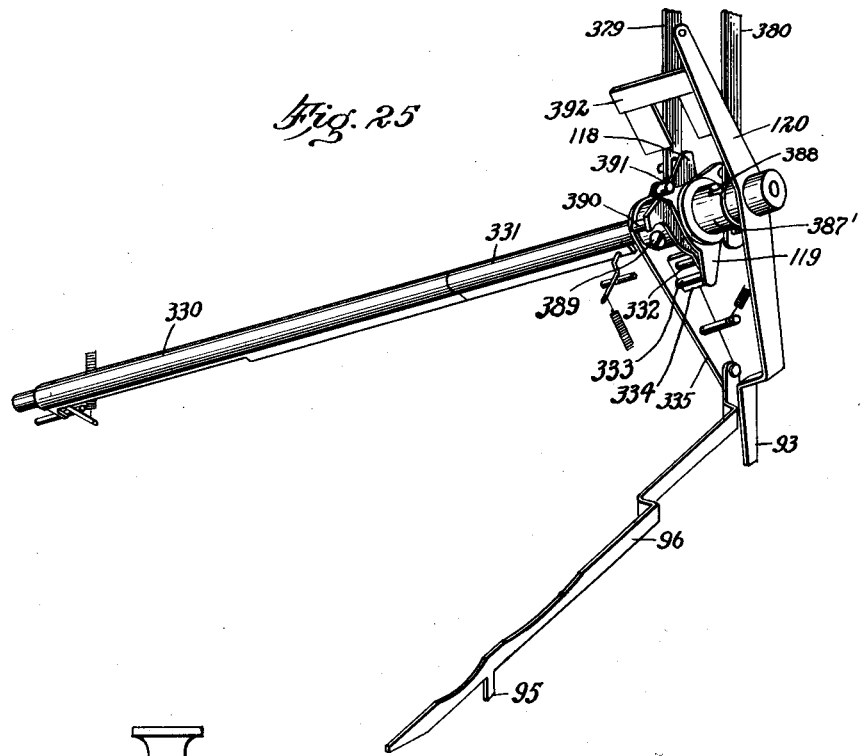
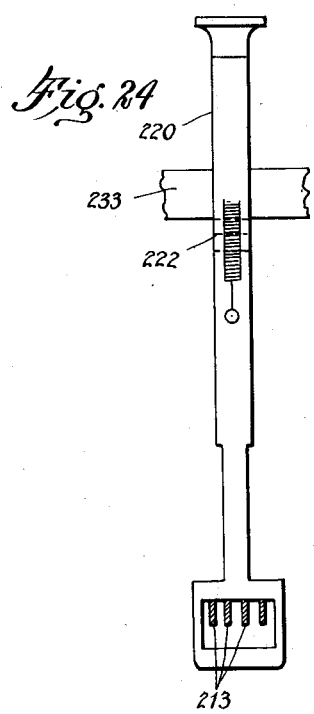
INVENTOR,
Michale G. de Simone,
BY
Henry J. Lueke,
ATTORNEY.

Patented Nov. 8, 1932

1,887,258

UNITED STATES PATENT OFFICE

MICHELE GUGLIELMO DE SIMONE, OF STAPLETON, NEW YORK, ASSIGNOR TO GEORGE B. AGNEW, OF NEW YORK, N. Y.

CALCULATING MACHINE

Application filed June 12, 1926. Serial No. 115,660.

This invention relates more particularly to calculating machines. More particularly, the invention is directed to machines for ascertaining the value of an independent variable then finding a value of a determinable function of said independent variable.

In its present form the invention represents improvements in machines of the type of my former Patent No. 1,450,718, although certain features of the present machine, as will hereinafter appear, are applicable to other machines.

A particular aspect of this invention is a machine for ascertaining the product of two quantities, one of which is the aforesaid independent variable.

In a common form of the invention, my calculating machine embodies mechanism for ascertaining the product of an optionally selectable value when multiplied by a quantity which may be an unknown difference of a pair of quantities or a multiple of a known quantity.

The invention is capable of effecting the various computations in quantities representable by other than the decimal system, as for example the usual system of units employed to represent time, avoirdupois weight, linear measures in feet, inches, etc., etc.

A further feature of my invention is a mechanism for calculating the values of discontinuous functions as for example contents of packages identifiable by, say, catalogue numbers, weights of unit lots identifiable by store requisition numbers, etc., etc.

A further feature of the invention is the provision of means for selectively summing series of independent variables, dependent variables, or both at the option of the operator.

A further feature of the invention is to make provision for increasing the number of totalizers in the machine with a minimum of changes in the principal operating elements.

The manipulation of the various forms of the invention is facilitated by a key board having one or more sets of keys arranged to effect convenience in establishing a mechanical representation of the observations which constitute the data of a computation, the particular arrangement of the keys on the keyboard being determined by the nature of the computations and the relative character of the units in which the observations and computations are expressed.

The invention further provides means for printing or listing, in whole or in part at the option of the operator the results of a computation during a normal adding cycle of the machine, with provisions for effecting such printing or listing during a totaling cycle irrespective of the optional condition during an adding cycle, and such printing will appear in the particular units in which the computations are to be expressed.

Further objects and features of the invention, generally and particularly, will appear more fully in the following detailed description and from the accompanying drawings forming a part hereof, in which—

Fig. 2 is a section of the machine along the line 2—2 showing certain parts in their normal or home position;

Fig. 3 is a section similar to Fig. 2 with many of the parts in an operated position;

Fig. 4 is a section along the line 4—4 of Fig. 1 showing the one set of integral argument keys;

Fig. 5 is a plan view of Fig. 4 omitting certain parts of Fig. 4; showing parts of the key releasing mechanism;

Fig. 6 is a detail view of one of the key shaft supports for the integral argument keys;

Fig. 7 is a diagrammatic view of the fractional argument keys with an S key depressed;

Fig. 8 is a diagrammatic view similar to Fig. 7 with an F key depressed and the machine partly operated;

Fig. 9 is a view of a portion of the main cam shaft with the attached cams and diagrammatic illustration of main driving mechanisms;

Fig. 10 is a view of one form of totalizer actuator with the cam for operating the general operator, said view is one taken approximately on the line 2—2 of Figs. 1 and 9;

Fig. 11 is a view of the key releasing cam;

Fig. 12 is a view of the mechanism controlled by cam and is a section of the machine along the line 12—12 of Figs. 1 and 9 with certain parts omitted;

Fig. 13 is a view of the mechanisms controlled by cam and is a section of the machine along the line 13—13 of Figs. 1 and 9;

Fig. 14 is a view of the totalizer connecting and disconnecting mechanism, lying in approximately the plane of Fig. 12;

Fig. 15 is a detail view of an element occurring in Fig. 14;

Fig. 16 is a view similar to Fig. 14 with many parts in an operated position;

Fig. 17 is a sectional view of a totalizer at the instant that the transfer mechanism is being tripped;

Fig. 18 is a view of the mechanism of Fig. 17 at a later epoch;

Fig. 19 is a view of the mechanism of Fig. 18 at a later epoch;

Fig. 20 is a section of the machine along the line 20—20 of Figs. 1 and 9;

Fig. 21 is a diagrammatic perspective view of a frame carrying a set of totalizers;

Fig. 22 is a view of the special character printing mechanism;

Fig. 23 is a section of the machine on the line 23—23 of Fig. 1;

Fig. 24 is a front view of a function selecting key;

Fig. 25 is a detail perspective view of the mechanism connected to the printing keys; and Fig. 26 is a sample of work performed, other samples occur in the specification.

Figure 1:
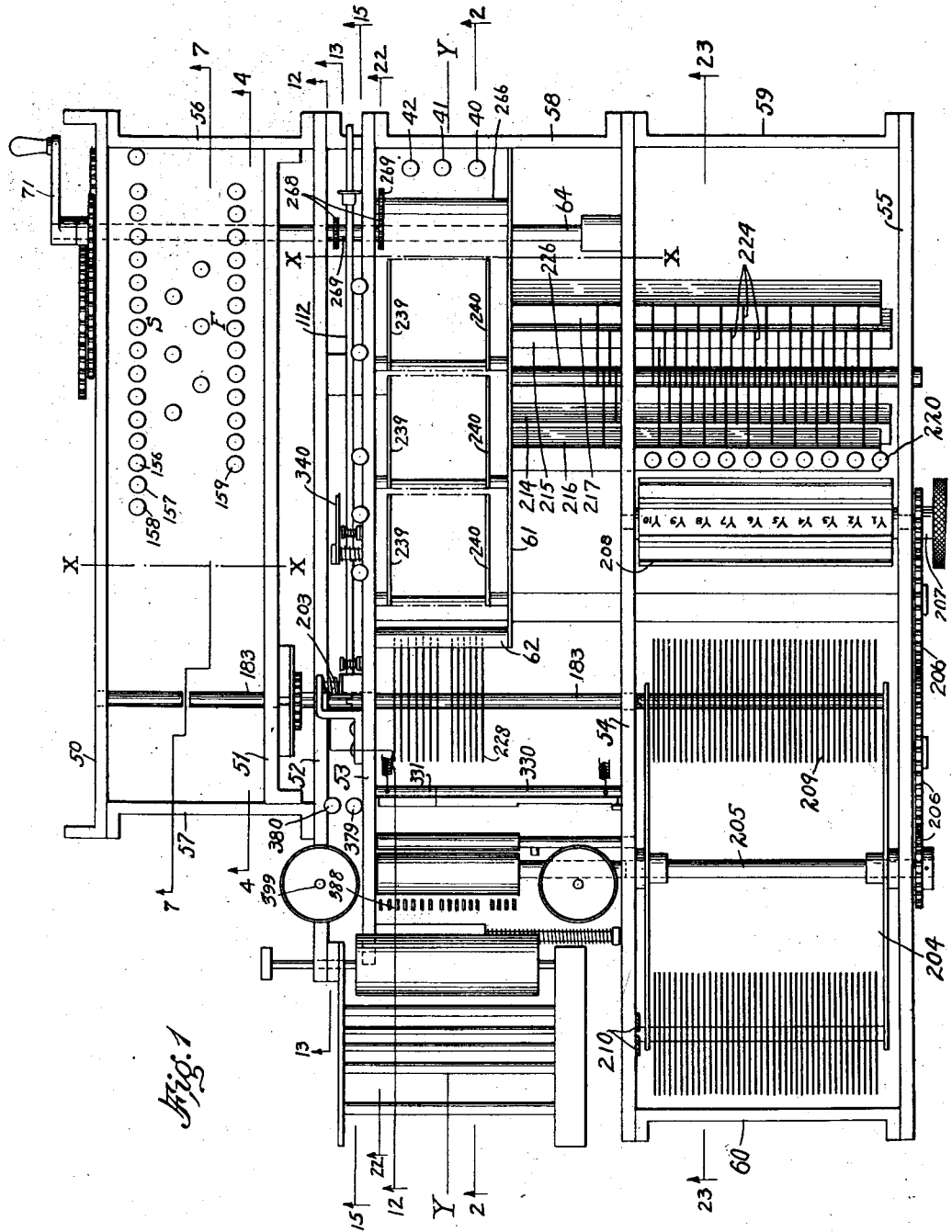
Fig. 1 is a diagrammatic top plan view of the machine with the cover removed and many elements omitted in order to show the general arrangement of the various parts of the machine; said figure also shows certain elements which do not appear in any of the remaining figures.

As one form of the invention, assuming the independent variable to be a difference; such as for example elapsed time for computing wages, interest, etc.; and the function to be computed is a selectable constant quantity multiplied by the independent variable such as a wage rate, interest, etc., so that said function may represent a wage, interest, discount, etc., I shall set forth the essential features of the invention in such form and indicate certain modifications rendering it adaptable to other problems. In such form of the invention, I provide a key-board comprising two sets of keys or their equivalents which mechanically represent two dates and from such pair of mechanical representations I mechanically compute the difference, which is then multiplied by a constant selectable from another set of keys or their equivalent.

Additional keys are provided for effecting or controlling the printing of the total of selected groups of the independent variables, or periods of elapsed times, and also corresponding totals of the dependent variables. Such keys are generically denoted as total keys. Such grouping requires plural groups of sets of totalizers and means are provided for selecting a totalizer for actuation from certain of said sets and groups of totalizers; such keys may be generically designated as totalizer selecting keys. By means of my mechanism a particular totalizer is selected for operation by the combined action of two keys, the total number of keys being less than the total number of totalizers. Thus suppose the existence of MN totalizers the selecting keys will be merely M+N in number. At times it is desirable to be able to list or record a total without clearing certain totalizers, to effect such at least one subtotal key is provided for at least one set of totalizers. In order to optionally disable the printing of certain items constituting a sum a plurality of printing control keys are provided. The usual repeat and error keys are provided.

The machine may be actuated either manually, by means of a suitable crank, or automatically by a suitably located and controlled motor. Such motor control may take the form of a starting key or button for causing the motor to be connected to the main cam shaft in any well-known manner. A machine embodying the features embodied herein has been found to be practical.

*Outline of specification*

The machine of which this is a specification is somewhat complicated and many elements are involved in the proper functioning of the machine. In order to give an idea of the contents of this specification and of the machine as a whole it may be said that a suitable framework is provided which is designed to properly locate all centers and guiding means for all elements. A main cam shaft is provided with six rigidly attached cams which are briefly described immediately following a brief description of the main shaft. The proper operation of the machine depends upon the manipulation of certain keys which in various combinations determine the amounts to be inserted into the totalizer or totalizers, including normally inactive sets of totalizers. Hence following the brief description of the cams follows a description of first the argument keys which are utilized to mechanically represent a set of observations, then the arrangement of a mechanical table controlled by various combinations of keys for computing a function of the variables derived from a setting of the argument keys. A discussion of various arrangements for reading the mechanical table follows, including a brief discussion of mechanical representation of precomputed functions. Next come the arrangement and operation of the totalizer actuators, following which is a generic description of a totalizer and its associated transferring mechanism. General arrangements of sets and groups of totalizers are then described. The totalizers are constructed so as to be connected with and disconnected from their actuators at various times for adding, totaling, etc.; a description follows including means for selecting normally inactive sets of totalizers. Such mechanism is intimately interwoven with the timing mechanism for causing the totalizers to receive accumulations and to exhibit the results of such accumulations so that such mechanism is described in part prior to a full description of the total keys which follows. Then follows a description of the printing hammer mechanism with means for optionally disabling certain of the hammers and the paper and ribbon feed mechanism. In conclusion, some typical examples of computations with various totalizer arrangements are briefly described.

Framework of the machine

Throughout the specification which follows, numerous elements and parts are described as being carried by the framework of the machine. Very few of the drawings show any framework at all, for to do so would unnecessarily complicate the maze of lines which are inevitable in drawings illustrating machines of this class. The plan and general arrangement of the main frame is best shown in Fig. 1. Generally the frame consists of six relatively thin longitudinally extending skeleton castings 50, 51, 52, 53, 54 and 55 held together and squared by the end castings 56, 57, 58, 59 and 60. From said Fig. 1, it is clearly seen that the machine is divided generally into four main parts, the one between frames 50 and 51 comprising the argument key section for initiating a mechanical representation of the independent variable, the second comprising frames 52 and 53 for supporting most of the elements for timing the totalizers and the elements associated with cams 66, 67 and 68, the third between frames 53 and 54 comprising the totalizers, actuators and printing section containing the totalizer actuator controlling mechanism, cradles for the totalizers, and the printing mechanism controlling devices, fourth and finally, that between frames 54 and 55 which contains the mechanical table and its controlling means; the said table includes a reel of sets of notched disks which are mechanical representations of precomputed functions for various values of the independent variable which can be mechanically represented on the argument key board. As stated the greater part of the links, arms, levers, etc. controlled and operated by cams 66, 67 and 68 are mounted on and between the sides of frames 51, 52 and 53. Nearly all the links, levers, etc. associated with the various timing of the totalizers is carried by the sub-frame 53. Frame 61 is of comparatively thin sheet metal, supported and carried in part by generously dimensioned studs 62 rigid with the sub-frame 53. If it should be desired to increase the number of totalizers in a set, such can readily be done by increasing the width between frames 53 and 61, it being evident that sufficient space is left over for such an increase as is clearly indicated in Fig. 1. Similarly the frames 50, 51, 52, 53, 54 and 55 can be of increased length to accommodate a larger number of groups of totalizers. Such increase in capacity with the necessary changes in dimensions is indicated throughout the drawings as will be more fully explained hereinafter.

Main shaft

All movements of all elements effecting mechanical computation, recording, etc. are under control of a main cam shaft, which may be given a single rotation by any desirable means such as a manually operable crank or a suitably connected source of power. Mounted on said shaft are a series of cams which impart motion to various elements. For the purposes of this explanation, said cams may be conveniently considered as acting at different successive periods, although exigencies may demand that under certain forms of my machine certain of these cams may be effecting simultaneous movements of different elements.

The main shaft is illustrated in part in Fig. 9. A diagrammatic manual operating system is indicated at 71 and a diagrammatic power source is indicated at 72. Rigidly mounted on the main shaft 64 are the cams 65, 66, 67, 68, 69 and 70. Briefly these cams control the following operations:—

Cam 68 translates the keyboard set up to a tabular acutator control; effects an idle movement of the transfer cams; conditions the printing hammers so that they can be subsequently fired; unlocks the paper and ribbon feed mechanism; locks all total keys against operation; releases the mechanical table control ratchet; and positions a lever for elevating any depressed total keys.

Cam 65 controls the actuators in their movements to permit the amount represented on the previously positioned mechanical table to be transferred into a mechanical displacement.

Cam 67 locks the type carriers in positions assumed when the actuators determine the amount standing on the notched disks of the mechanical table; permits the actuators to determine which printing hammers are to be fired; operates to normally connect a set or group of sets of totalizers with actuators; releases the printing hammers for printing; prepares to feed the inking ribbon and the paper; raises the ratchet controlling the mechanical table; and withdraws the printing hammers a slight amount so that the type carriers can descend.

Cam 65 comes into action again to restore the actuators and type carriers to normal position.

Cam 66 operates to normally disengage a set of totalizer or a group of sets of totalizers; and unlocks any depressed total keys.

Cam 68 comes into action again to effect any necessary transference of tens; effects a feeding of the paper and inking ribbon; engages the mechanical table control ratchet; operates the lever to elevate any depressed total keys; restores the mechanical table to normal "no entry" position; operates the lock which normally locks the total keys at normal; releases the one way lock so that the type carriers can ascend on a subsequent operation; and recocks the printing hammers.

Cam 69 operates to restore the fractional units mechanism to normal.

Cam 70 operates to release argument keys, and restore their respective stops to normal.

In Fig. 1, a crank 71 is shown which is connected through suitable gearing to the main cam shaft for effecting a manual drive of the machine.

The elements of the machine come into operation in substantially the order indicated. As noted above, certain elements are moved to one position by certain cams and restored to normal by another, as for example, the ratchet control pawl, the platen and ribbon feed, etc.

Cam 68

Cam 68 as pointed out under the heading Main shaft is the first cam on the main shaft 64 to begin to move its connected parts. Said cam is preferably of the complemental or frog type and operates a parallelogram system of links including the long lever 73, see Fig. 12. Said long lever 73 is connected by a link 74 to a reversing idler lever 75 rotatably mounted on a framework supported stud; said idler lever in turn is connected by a link 76 to member 77 rotatably mounted on a stud 78 carried by the main framework. Said member 77 is provided with guiding flanges 79 straddling an arm of the sector 80 also pivoted on the said stud 78 (see heading Setting of notched disks). Said member carries a stud 81 to which the link 82 is attached for rocking the lever 83. All elements so far described lie on the rear side of a main frame casting which, if shown in Fig. 2, would lie in front of the parts so far described, but the lever 83 is constructed in a manner which may be likened to a box without top or bottom with a side on each of the front and rear of the above mentioned frame. The pins or ends of said lever 83 extend through suitable openings in the frame. The lower end of said lever 83 is connected to two links 84 and 85 extending generally rearwardly, the one 84 serving to actuate an arm 86 (see also Figs. 13, 14 and 16 and headings Restoring disabled forks and Notched disk ratchet) carrying a spring urged wipe pawl 87 which is ineffective when traveling rearwardly but interferes with the lower ends of levers 88 and 89 when traveling forwardly at near the end of the operation of the machine. The link 85 extends rearwardly where it connects with a crank arm 90 rigid with the shaft of recocking cam 91 (see heading Recocking of printing hammers). Said link 85 carries a stud 92 which releases the lever 93 for operation (see heading Platen and ribbon feed). Said link also carries a stud 94 which may on occasion interfere with a downwardly extending projection 95 on the draw bar 96 (see heading Total keys enable printing mechanism). The upper end of lever 83 is also connected to two links, the one 97 serving to oscillate the sector 98 (see heading Transfer cams) to effect rotation of the transfer controlling cams and the other link 99 extends rearwardly, i. e. to the left as viewed in Fig. 16, to rock a stud carrying lever 100 to lock the total keys against depression after the machine starts to operate (see heading Machine locks total keys).

Cam 65 and theoretical timing

Cam 65 controls the oscillatory movement of the totalizer actuators. Said cam is of the complemental or frog type and operates arm 101 (see Fig. 10) through a suitable series of arms and links. Said arm 101 is connected by a short link 102 (see Figs. 2 and 3) to a general operator 103 pivotally carried by the main frames of the machine. Said general operator 103 is provided with a series of knuckles through each of which pass rods 104 of adjustable length connected to member 105 of a totalizer actuator. The normal position of the member 105 can be accurately determined during assembly of the machine by means of the lock adjusting nuts 106 on rods 104.

All actuators 105 are permitted and in addition resiliently forced to assume differential positions under control of said cam and the previously positioned notched disks and are restored to normal by said cam. Certain elements must be positioned prior to movement of the actuators and others can be conveniently positioned at such prior time. Such comprise the elements listed under the heading Main shaft in connection with the individual cams.

Manifestly an effective operation requires the setting of a set of observations on suitable keys or their equivalents and the setting of the notched disks by action of cam 68 to determine the extent of movement of the actuators. The remaining operations effected by cam 68 are the positioning of elements which will act later and to safeguard the mechanism against incompetent or negligent operators. Many of the movements occurring at this time are for convenience of construction and design only.

After the actuators have assumed their differential positions and before return to normal position there ensues the proper time to effect printing, if such should occur, and to connect the totalizers with their actuators for partaking of their return movement for adding or disconnecting them during totaling.

The remaining time is really the completion of a computation and transferring is then fully effected and the other movements are merely a "clean-up" for the next operation.

Cam 67

Cam 67 is one of the cams rigid with the main shaft 64 and it is utilized to:—(See Fig. 13).

Connect the totalizers with their actuators during adding or disconnect them during totalizing;

Control the movement of the notched plate ratchet pawl;

Operate the cam 107 to partially withdraw the printing hammers from fired position;

Trip the printing hammers when printing is to be effected; and

Initiate or position elements to feed both the paper and inking ribbon.

Said cam 67 is of the complemental or frog type and operates a parallelogram of links and levers including lever 108 which is connected by a short link 109 to arm 110.

The upper end of arm 110 is adapted to cooperate with collar 111 on shaft or bar 112 to shift the same forwardly to connect the totalizers with their actuators during adding or disconnect them during totaling.

Arm 110 is connected to long link 113 which controls the movements of pawl 114 as is fully described under the heading Notched disk ratchet.

Arm 110 is also connected to long link 115 which controls the partial recocking of the printing hammers by moving arm 116 rigid with the shaft carrying cam 107 as described under the heading Main shaft control of printing mechanism. Said link carries the pin 117 which extends on both sides of the link 115 to rock members 118 and 119 to release the printing hammers as is fully described under the heading Printing mechanism. Said pin may indirectly operate lever 120 to position the elements to feed both the paper and inking ribbon as described under the heading Paper and ribbon feed.

Cam 66 and total key lock

Cam 66, see Fig. 20, is utilized to unlock any undepressed total keys and to disconnect the totalizers from their actuators during adding operations. Said cam is rigid with the main shaft and is provided with single nose arranged to cooperate with an antifriction roller at the lower end of the lever 121, (see Fig. 20). Said cam 66 acts on a lever at near the end of the operation of the machine to rock such lever clockwise as viewed in Fig. 20 and hence shift the displaced shaft or bar 112 correspondingly after the totalizer actuators have reached home or normal position, by contacting with collar 111 rigid with said shaft or bar 112.

Each total key is provided with a pin 122 or equivalent which when the key is depressed contacts with the lower end of a pivoted member 123 thereby rocking the same to a substantially vertical position. Several of said members may be connected together by a link 124 so that when a total key is depressed all will be rocked, and when so rocked the upper end of said members will lie in the path of the corresponding pin on the remaining total keys thus locking them in their normal position. In the case of a sub-total key the corresponding pin 122 is short so that the upper end of corresponding locking member 123 is provided with a flange 125 to lock said key in normal position. One of the members 123 may be provided with a lower extension 126 with a rigid pin passing through a slot in a link 127 joined to the upper end of lever 121, so that when said lever is shifted clockwise by cam 66 the link 127 will rock the locking members 123 to the position illustrated.

Cam 69 (Fig. 7)

Cam 69 is utilized to restore the elements displaced by the fractional argument keys to normal position. Said cam is rigid with the main shaft 64 and cooperates with a lever 128 pivotally mounted on a frame supported stud. The upper end of said lever is in the path of movement of a lug 129 rigid with link 130 of the F set of fractional argument keys. Before cam 68 has completed its initial action cam 69 has released lever 128 so that spring 131 (see Fig. 12) can adjust the various links to a position such as shown in Fig. 8, an amount commensurate with the fractional part of the argument or independent variable. After the totalizer actuators have returned to normal position cam 69 rocks lever 128 which moves link 130 and the connected parts to normal position preparatory for the next operation.

Cam 70

Cam 70 is utilized to release all depressed argument keys. In view of the fact that the fractional argument keys must be depressed in a prescribed order the said keys must be released in a prescribed order. Cam 70 is rigid with the main shaft 64 and its nose or operating projection is adapted to cooperate with a pawl 132 pivoted to an arm rigid with jack shaft 133 as shown in Figs. 4, 5 and 11. Rigid with said jack shaft is a pair of differentially timed cams 134 and 135 lying under arms 136 and 137 respectively. Arm 137 is rigid with a supporting arm of locking plate 138 for the F keys and is raised by said cam 135 which is timed to act first with a movement of jack shaft 133. After the F keys have been released cam 134 elevates arm 136 rigid with a supporting arm of the locking plate 139 for the S keys. A pair of arms 140 and 141 are connected to parts 142 and 143 for rocking shutters 144 and 145 which release the partially depressed integral argument keys. Also attached to said jack shaft is a pair of arms connected by links 146 and 147 to arms 148 (see Fig. 11) rigid with the collars 149 and 150 mounted on the hubs of disks 151 and 152 respectively. Lugs rigid w th the frames are provided with rigid pins 153 and 154 passing through short helical slots in the said collars, hence rotation of said collars cause them to approach each other and the flanges thereon restore any actuated stop members 155 to normal position. Hence cam 70 releases the depressed fractional argument keys in the reverse order in which they must be depressed.

Argument keys

The machine described and illustrated herein may be briefly described as a machine for mechanically accumulating amounts functionally related to an argument. Familiar examples are; wages corresponding to time worked; price for a given quantity; interest both simple and compound; meter service computations; weights for a given quantity of material; conversion of units, as feet to meters, pounds to kilograms, gallons to cubic feet, etc. etc.; various payroll systems including hourly rates, piece work, extra pay for overtime, etc. In general any computation which can be tabulated as "single entry". The mechanism for determining the "argument" will now be described. Frequently the argument is a difference such as: the difference between starting and finishing time; the difference between old and new readings; the elapsed time between two dates, etc. For convenience of illustration and description, a form of the machine adapted to compute wages from elapsed time will be specifically described. The slight modifications, if any, for adapting the machine for other requirements such as above indicated will become apparent as the description proceeds.

Referring to Fig. 1, there are seen four rows of keys designated respectively by reference characters S and F. The first two rows may be conveniently designated as the starting time (old date, old reading, etc.) and the last two rows as the finishing time (present date, new reading etc.). The first and last key rows may be conveniently considered as representing integral hours and the middle rows as fractional hours. There are certain additional keys such as 156, 157, 158, which may completely change the normal values of the aforementioned key as will be described fully hereinafter.

This mechanism is in principle analogous to that disclosed in my Patent No. 1,450,718 and will be described comparatively briefly herein dwelling particularly on the improvements in construction.

Integral argument keys

All the keys relating to the integral part of the argument are identical in principle and very similar in structure. As shown in Fig. 4, each key is provided with a suitable finger piece suitably attached to a stem 160 guided by the frame near its upper end and guided at its lower end by having its shank turned so that it can be readily supported by a pin through the keyshank and the prongs of the bifurcated lever 161 rigid with the associated shaft 162. All the shafts are suitably supported by bearing plates, see Fig. 6, formed as coarse complemental combs. Near one end, each shaft 162 is provided with a rigid cam 163 which on occasion forces lever 164 towards a disk 152 against a suitable spring tending to hold it in normal ineffective position. Each lever 164 is provided with an extension which may cooperate with a stop lever 155 extending in a radial direction and pivotally mounted on disk 152. Said stop lever 155 may occupy either of two positions as may be seen by comparing adjacent stop members 155 in Fig. 5; said members are resiliently held in either position by the location of a pin 165 cooperating with formed portions on the springs 166. Obviously when any of said radial stop members 155 are set by the depression of the corresponding key, the end thereof nearest the center of the disk moves away from the said disk as is clearly shown in Fig. 5. Such movement is utilized in restoring said members to normal by transversely shifting the collars 149 and 150, as has been described fully hereinabove. Each key 160 is provided with a pin 167 which passes beneath the shutter 145 when said key is depressed, but the key returning spring causes the key to return almost to normal when the pressure on the key head is relieved, thus giving a visual indication of the key depressed. It may be added that the function of a key is completed when its corresponding stop lever 155 is rocked to a position causing its end to project beyond the face of a disk 151 or 152 to form a set stop, so that the partially depressed key is merely a signal.

Fractional argument keys

Two of the rows of keys designated generically as S and F in Fig. 1 have been called fractional argument keys; these keys must be operated in a prescribed order. Referring to Fig. 11, let us assume that S 15 key is to be depressed, said key, as are all the fractional keys, is provided with a pin 168 which extends on both sides of the key shank; therefore depression of said key will shift plate 139 against the action of a spring 169 and when fully depressed projection 170 will latch over said pin and hold it in depressed position, in a well understood manner. Suppose now that the S 30 key is depressed, as before plate 139 will latch over its pin 168 to hold said key in depressed position; however a notched plate 171 lies in front of said key but a slot therein will permit depression of said key; if however said plate were shifted before depression of said key, shoulder 172 of plate 171 would be in the path of said pin 168 and thus block depression. Thus suppose the F 30 key were depressed its pin 168 would hold plate 171 shifted by virtue of the cooperation of its pin 168 with slope or cam 173 of the plate 171 and hence shoulder 172 would be in the path of pin 168 on the S 30 key. If however the S 30 key were depressed first then the F 30 key depressed the plate 171 would merely "doubly lock" the S 30 key in depressed position. Plate 138 is utilized to hold the F keys in depressed position as plate 139 serves to hold the S keys in depressed position. Hence an S key must be depressed prior to the depression of an F key. Referring to Figs. 7 and 8 which it will be remembered are merely diagrammatic views to illustrate the operation of the keys. Each S key is provided with a different cam 174 which cooperates with a pin on link 175 to shift the same as shown, moving with said link 175 and therefore assuming corresponding positions are the parallel arms 176, 177 and 178. The arm 177 is connected to arm 179 by a notched link 180 cooperating with a pin 181 rigid with said arm 179, which in turn is connected by a link 182 with disk 151 which is loose on shaft 183. Hence depression of any S key will rock disk 151 an amount corresponding to the slope of the cam 174 associated with the said depressed S key and therefore with its indicia.

If now an F key, such as the F 45 key is depressed, a pin 184 thereon will rock the resiliently urged shaft 185 so that the pin 186 rigid with said shaft will descend and link 187 supported by slot 189 surrounding pin 190 rigid with link 180 will descend also, thus causing a notch 191 in link 187 to engage pin 181. When the machine has been in operation long enough for cam 68, (see Fig. 12) to operate spring 131 in turn to rotate shaft 183 and a pair of projected stop members 155 interfere therefor, disk 151 will be rotated anticlockwise until arrested by the linkages comprising link 182, arm 179 with its pin 181 engaged by a notch 191 of link 187, siamese levers 188 and 192, link 193 and a pin thereon contacting with the cam 194 on the depressed F key. In this way the disk 150 and hence the notched plates connected with shaft 183 are adjusted differentially during the operation of the machine an amount commensurate with the fractional part of the difference between the amounts set up on the S keys and the F keys.

For purposes of simplified explanation the fractional argument keys have been shown as accounting for fractions comprising merely quarters. Manifestly other fractional divisions such as fifths, sixths, tenths or other convenient divisions of a unit may be effected by the mechanism described.

Mechanical table

The argument keys are provided for the purpose of initiating a mechanical representation of an independent variable ($x$); suitable mechanism is provided for determining a dependent variable ($y$) or function of the independent variable ($x$). Such means may be visualized as a "mechanical table" whose tabular values are located when the independent variable is mechanically represented by positioned elements. For purpose of illustration assume that a series of functions of the independent variable as herewith tabulated are to be computed.

*Table I*

| $x$ | $y$ | $\frac{11x}{4}$ | $\frac{100x}{32}$ | $\frac{5/6x^2}{y^4}$ | $\frac{2\frac{1}{2}}{y^5}$ | $\frac{1/6x^2}{y^6}$ | $\frac{J(x)+1}{y^7}$ | $y^8$ |
|---|---|---|---|---|---|---|---|---|
| 0 | 0.00 | 0.00 | 0.00 | 0.00 | 0.00 | 0.00 | 2.00 | 1.00 |
| 1 | 0.25 | 2.75 | 3.12 | 0.62 | 2.50 | 0.05 | 1.77 | 0.75 |
| 2 | 0.50 | 5.50 | 6.25 | 2.50 | 3.54 | 0.20 | 1.22 | 0.60 |
| 3 | 0.75 | 8.25 | 9.38 | 5.62 | 4.33 | 0.45 | 0.74 | 0.05 |
| 4 | 1.00 | 11.00 | 12.50 | 10.00 | 5.00 | 0.79 | 0.00 | 0.00 |
| 5 | 1.25 | 13.75 | 15.62 | 15.62 | 5.59 | 1.23 | 0.82 | 0.00 |
| 6 | 1.50 | 16.50 | 18.75 | 22.50 | 6.12 | 1.77 | 1.15 | 1.25 |
| 7 | 1.75 | 19.25 | 21.88 | 30.62 | 6.61 | 2.40 | 1.30 | 4.00 |
| 8 | 2.00 | 22.00 | 25.00 | 40.00 | 7.07 | 3.14 | 1.17 | 0.23 |
| 9 | 2.25 | 24.75 | 28.12 | 50.62 | 7.50 | 3.97 | 0.40 | 8.00 |
| 10 | 2.50 | 27.50 | 31.25 | 62.50 | 7.91 | 4.10 | 0.75 | 12.00 |
| 11 | 2.75 | 30.25 | 34.38 | 75.62 | 8.29 | 5.93 | 0.83 | 1.77 |
| 12 | 3.00 | 33.00 | 37.50 | 90.00 | 8.66 | 7.06 | 1.05 | 1.83 |
| 13 | 3.25 | 35.75 | 40.62 | 105.62 | 9.01 | 8.29 | 1.21 | 1.50 |
| 14 | 3.50 | 38.50 | 43.75 | 122.50 | 9.35 | 9.12 | 1.17 | 9.43 |
| 15 | 3.75 | 41.25 | 46.88 | 140.62 | 9.68 | 11.04 | 0.99 | 7.19 |
| 16 | 4.00 | 44.00 | 50.00 | 160.00 | 10.00 | 12.57 | 0.81 | 0.07 |

This table could of course be indefinitely extended. For the sake of illustration a small variety of functions of a single variable have been listed. The use of such a table is obvious, yet in order to understand the operation of the described machine, its use will be described in detail.

First, find some value of the independent variable $x$ (depress the proper argument keys); second, choose the function or dependent variable column whose value is desired (depress the proper function key such as rate key, interest key, etc.) third, locate the value of the independent variable in the x-column (operation of the machine at the time that a certain shaft is differentially positioned to mechanically represent the independent variable set on the argument keys in cooperation of the sets stops 155); fourth, pass in a straight line across the page to the dependent variable column previously chosen (operation of the machine at the time that certain preselected reading fingers under control of the last mentioned keys have traveled forwardly differentially, see Fig. 23); fifth, write down the chosen value $x$ and the located value of $y$ (operation of the machine at the time the values of $x$ and of $y$ are printed or computed, that is the position of Fig. 3). This description of the use of the above table at once suggests a mechanical construction of a table, thus a set of notched disks may be rigidly mounted on a shaft which may be turned through angular distances corresponding to the value of the independent variable $x$; obviously the set of notched disks will be notched to certain depths at each angular position of the disks corresponding to values of $x$ commensurate with the significant denominational digits of the function represented by the set of notched disks. Different functions will be represented by different sets of notched disks on the said differentially settable shaft. Different functions may be selected by connecting certain sets of reading fingers to the totalizer actuators, or by shifting the sets of notched disks or by both.

For the sake of generality several classes of functions are shown tabulated above including algebraic all except $y^7$ and $y^8$, transcendental ($y^7$), linear ($y^1$, $y^2$ and $y^8$), single valued, ($y^1$, $y^2$, $y^3$, $y^4$ and $y^6$) multi-valued ($y^5$) and discontinuous ($y^8$). In practice a single valued linear algebraic function finds the greatest range of applicability as such includes most of those listed under the heading

Argument keys

Referring to Fig. 7, there is seen a disk 151 with a certain number of equal divisions, (the illustration shows 14, the foregoing description, however does not limit the dimensions to such a number, and any convenient number could be used depending upon the type of problem to which the machine is to be adapted); each of these divisions may be identified with each of the values of $x$ in the preceding table. If desired, certain of the divisions may not find response in the said table for a purpose to be explained hereinafter. The integral argument keys, as has been explained, project certain stops on the said disk so that a differential angular movement of shaft 183 as determined by a pair of cooperating stops will determine a value of the argument or independent variable measured as an angular displacement, and hence a function set of notched disks may have their notches representing a precomputed value brought to a reading line by turning them through an angle corresponding to the independent variable used in computing such a value.

Special values and interpolation

Hereinabove the mode of arranging a set of notched disks having precomputed functional values corresponding to integral values of an independent variable have been described. Fig. 7 illustrates means for tubulating functional values corresponding to fourteen or less integral values of the argument, but such can manifestly be considerably increased to twenty or more if it should be so desired. Such a comparatively few divisions of the circumference of a disk such as that shown in Fig. 7 under the conditions of some applications of the mechanism may be too small, hence the provisions for an increase such as suggested. Hereinabove, means has been described for adjusting the shaft 183 through the agency of disks 151 and 152 fractional amounts of the arc between consecutive stops under control of the fractional S and F argument keys. Such fractional adjustment may be utilized to locate functional values lying between any two of the quantities listed in Table I.

Herewith is reproduced a portion of Table I with representative intermediate values filled in.

Table II

| x | $y^1$ | $y^2$ | $y^3$ | $y^4$ | $y^5$ | $y^6$ | $y^7$ | $y^8$ |
|---|---|---|---|---|---|---|---|---|
| 3.0 | 0.75 | 8.25 | 9.38 | 5.62 | 4.33 | 0.45 | 0.74 | 0.65 |
| 3.2 | 0.80 | 8.80 | 10.00 | 6.40 | 4.47 | 0.51 | 0.68 | 1.00 |
| 3.4 | 0.85 | 9.35 | 10.62 | 7.22 | 4.61 | 0.57 | 0.64 | 3.41 |
| 3.6 | 0.90 | 9.90 | 11.25 | 8.10 | 4.74 | 0.64 | 0.61 | 0.42 |
| 3.8 | 0.95 | 10.45 | 11.88 | 9.02 | 4.87 | 0.71 | 0.60 | 1.40 |
| 4.0 | 1.00 | 11.00 | 12.50 | 10.00 | 5.00 | 0.79 | 0.60 | 0.60 |
| 4.2 | 1.05 | 11.55 | 13.12 | 11.02 | 5.12 | 0.86 | 0.62 | 0.43 |
| 4.4 | 1.10 | 12.10 | 13.75 | 12.10 | 5.24 | 0.95 | 0.66 | 3.47 |
| 4.6 | 1.15 | 12.65 | 14.38 | 13.22 | 5.36 | 1.04 | 0.70 | 6.41 |
| 4.8 | 1.20 | 13.20 | 15.00 | 14.40 | 5.48 | 1.13 | 0.76 | 0.73 |
| 5.0 | 1.25 | 13.75 | 15.62 | 15.62 | 5.59 | 1.23 | 0.82 | 0.00 |

This portion of extended Table I indicates that each interval between the integral values has been subdivided into five equal intervals; such subdivision is really an optional one for the machine constructor, as such interval may be divided at pleasure into any convenient subdivisions as is well known by suitable interpolation formulæ and such subdivision will be dictated by the use to which the machine may be put. Thus if the machine is to be used for pay roll wage computation the subdivision may be quarters corresponding to an "undivisible" time of fifteen minutes, or again it may be divided into twelfths corresponding to an "undivisible" time of five minutes; similarly, for other practical uses.

For the sake of illustration let it be assumed that the disk 151 shown in Fig. 7 has twenty equal spaces for stops, and further that Table I with its sixteen integral values of the independent variable were to be utilized for such a machine in the form of suitable notched disks if desired it may be assumed that the said table is completely subdivided as indicated in Table II and is so represented on the sets of notched disks there are nevertheless four integral divisions with the potential subdivisions which could be represented on the functional disks by blank or zero spaces. If desired, since it has been assumed that a further extension of Table I would be useless, an entirely new set of functions may be tabulated on the remaining unoccupied integral divisions. Taking a pay roll machine as an example, a table similar to Tables I and II may contain the wages for full and fractional hours of a working day then the remaining spaces may be utilized as follows:

First unused integral space located by a special key in sets of keys assigned to the integral argument which may be utilized for calculating wages for a full week's work by setting a stop on disk 151 which may cooperate with a stop set on disk 151 by suitable Zero key such as 159 as shown in Fig. 1, the depression of any fractional argument key may then be used to determine a subdivision of the said selected integral space for say multiples of a weekly wage. Thus the said special key may be called a "Weekly key" (see members 156 and 159 in Fig. 1) then the fractional argument keys will determine the wages for a plurality of weeks corresponding to a numerical indicia assigned to said key.

Again the second unused integral space may be located by a key similar to the Weekly key 156 for say monthly salaries, (see members 157 in Fig. 1) and the fractional argument keys may then determine multiples of months in a similar manner.

Perhaps some men may be employed for a standard "short week" then use can be found for a "Short weekly key" 158 in combination with the fractional keys as before.

Again certain computations often require the use of certain constantly recurring constants, such as certain simple functions of the ratio between the circumference and diameter of a circle, the base of the natural system of logarithms, etc. Such may be controlled by key 158 in certain adaptations of the machine described.

The flexibility of the mechanical tables is so great that only a few uses or possible uses can be catalogued here; others will naturally occur to the alert reader of the foregoing description.

Certain functions are of a nature such that their properties facilitate interpolation. A linear function is especially adaptable to interpolation. Suppose it is desired to calculate 9743A where A is any constant whatever, ¼, say, Table I would give $$43A = 10.75$$

Special values under control of keys such as 156, 157, 158 and 159 in combination with the fractional argument keys may cause the machine to record $$700A = 175.00$$
$$9000A = 2250.00$$

Then we would have, by virtue of the fundamental property of linear functions $$43A = 10.75$$
$$700A = 175.00$$
$$9000A = 2250.00$$
$$\overline{9743A = 2435.75}$$

A somewhat more general problem would be to find 9743A + B where, for sake of illustration B will be set equal to 7.79 and A equal ¼. Then tables similar to Tables I and II would give $$43A + B = 18.54$$
$$700A + B = 175.00$$
$$9000A = 2250.00$$
$$\overline{9743A + B = 2443.54}$$

Other obvious solutions of the above problem will occur to the alert reader; thus the notched plates can manifestly be arranged to cause the machine to record after a series of plural operations.

$$3A + B = 8.54$$
$$40A = 10.00$$
$$700A = 175.00$$
$$9000A = 2250.00$$
$$\overline{9743A + B = 2443.54}$$

A practical application of such an example would be an allowance of $7.79 for setting a tool and a wage of ¼¢ for each of 9743 parts.

The examples given fully illustrate one form of interpolation dependent upon the properties of a particular function. In the case of other functions other interpolation formulæ dependent upon the functional properties can be derived, such may usually be found in treatises on the particular function, such being usually designated as the "addition theorem" for the particular function.

*General problems capable of solution*

In the description of the mechanical table it has been tacitly assumed that, either the independent variable is known ab initio or that it is automatically determined prior to an operation of the actuators. Many problems of frequent occurrence are of the former type, as for example conversion of one set of units of measurement to another, or entities connoting quantity to entities representing mass, weight, etc., as for example, converting English system units to metric units, converting number of articles of given dimensions to units of weight, value, etc. Such problems can be represented by a general formula such as: $y=f(x)$. Further in certain cases the fractional argument keys may vary the value of the independent variable as set upon the integral argument key so that the machine will compute $y=f(x+z)$ where $x$ may be interpreted as representing the integral part of the argument and $z$ an additional or fractional part. Again the above description shows the capability of the machine to find the dependent variable in the case $y=f(nx+z)$ as is described in connection with linear interpolation.

As has been indicated herein, and as is described in my Patent No. 1,450,718, the independent variable is not known ab initio but must be determined prior to a movement of the actuators, the keys denoted generically as S and F are interconnected to effect such a determination so that the independent variable may be a quantity which is invariant with respect to the origin of measurement, such as a difference. Hence the machine is capable of solving a problem represented by $y=f(x-z)$. When combined with the fractional argument keys this formula takes the more general form $y=f(x+z)-(z+u)$. Following the same reasoning as above the functional form may be $$y=f(nx+t)-(mz+u).$$

Since the machine is provided with totalizers a sum of any set of the functions may be obtained. Hence the mechanism herein described is of very wide application in solving a multitude of otherwise complicated problems.

Another variation is a case where the function computed is of the form $$y=f(nx\pm t)-(mz\pm u)\pm A.$$

A practical example of the latter may, for properly chosen values of the constants, represent wages per fractional day where a certain time has been omitted for the lunch hour, or in calculating interest and discounts when allowing for the usual "grace days".

Again the machine is capable of printing and calculating quantities connected with a discontinuous set of independent variables as for example weights or prices per unit quantity associated with stock or catalogue numbers. Thus such identifying numbers may be set up on the argument keys and the function reel will during an operation of the machine position the function disks so as to cause the machine to list the corresponding weights, prices, etc.

It is not intended to limit the practical application of the machine to merely the few examples cited in this specification as the machine can be used for any computation falling within any of the above listed general formulae.

*Function reel*

As indicated in Table I under the heading Mechanical table a large variety of values of independent functions, either continuous or discontinuous may be mechanically represented by notched disks in the machine. Ordinarily each of the series of values for the various functions can be represented by a few notched disks such as three or four; even if the functions had large values five or six disks would for all practical purposes suffice; the aggregation of disks representing a particular function is herein called a function set. If the function sets are quite large such as for example forty to one hundred a random arrangement of such function sets might be quite bulky. Applicant has found a convenient and practical mode of storing such a group of function sets and yet have any function set readily available for reading. By way of example a convenient number of sets (say ten) may be mounted on one shaft, and a plurality of such shafts may be mounted on a reel as is indicated somewhat diagrammatically in Fig. 1. The reel 204 is fast on a shaft 205 which is connected by a series of gears 206 to a manually controlled shaft 207 to which is affixed an indicia bearing drum 208 having suitable indicia representative of the location of the various function sets carried by the reel 204. Hence manual rotation of shaft 207 will bring a group of the ten (say) function sets into a position to be differentially rotated by the shaft 183.

Each shaft 209 carrying the function sets is feathered at one end for cooperation with a slot in the end of shaft 183 as indicated in Fig. 1. Suitable means such as a groove or track may be affixed to frame 54 to prevent accidental rotational movement of the group of function sets when out of control of the shaft 183 as is indicated in fragmentary section by reference character 210.

The construction and arrangement is such that the reel 204 is readily removed from the machine so that a different reel may be inserted therein to provide for an additional set of functions; or as an alternative a shaft supporting a series of function sets may be substituted for any one or more of those occurring on the reel.

*Reading function disks*

The arrangement of the function sets of notched disks was described under the heading Function reel. After the reel has been positioned it is necessary to read the precomputed value of the function for insertion into at least one totalizer and for optional listing or printing. After the shaft 209 and the selected function sets have been differentially set under control of the argument keys through shaft 183 the machine then automatically reads the precomputed functional value, such reading is effected by a series of denominationally arranged rectilinearly guided reading fingers 211 as shown in Fig. 23. Said fingers 211 are guided by the frame supported guides 212 and their forward ends are connected to a pin carrying element 213 which may be optionally connected to the totalizer actuators through the transsetting bars 214, 215, 216 and 217. Hence said fingers 211 are resiliently forced to the bottoms of the notches of the functional set by the springs 104 and 104', (see Figs. 2 and 3) acting on the actuators under control of the general operator 103, and since they are connected to the actuators, the said actuators may therefore be said to read the functional values through the transsetting mechanism and reading fingers 211. Normally the said reading fingers 211 are disconnected from the actuators, and are held in the position shown in Fig. 23 by means of a frame supported plate 221 cooperating with lugs 218 and a similarly supported plate 219 cooperating with their extreme forward ends, thus guarding against accidental displacement when not connected to the actuators.

*Function selecting keys*

Under the heading Function reel, it was intimated that any particular function could be selected for reading under the combined control of the manual reel adjusting shaft 207 and certain function selecting keys. The function selecting keys 220 (see Figs. 1 and 23) correspond in number to the number of function sets on a positioned shaft 209. Each function selecting key is guided so as to have substantially rectilinear movement by being guided near one end by the top cover of the machine and near the lower end by frame supported bracket and locking member 221. Said keys 220 are normally urged upwardly by a suitably located spring, and each is provided with a suitably located attached lug 222 which, when the key is depressed rocks the resiliently urged shutter 223 which snaps over the top of said lug, locking the key in depressed position. The arrangement is such as is commonly known as flexible, hence the depression of any key results in releasing any other depressed key, as is exemplified in the well known patent to Selling.

Each key 220 is provided with an opening at its lower end through which passes the denominational set of members 213 connected with the reading fingers 211 as is indicated in Figs. 23, 24. Each of said members 213 consists of a pair of side plates which are held in spaced relation by suitably located spacers as that said side plates always straddle the tips of the arms 224 on the transsetting bars 214, 215, 216 and 217. This construction insures a proper alignment so that the depression of a key 220 will insure an engagement of pin 225 between said plates with the bifurcated upper end of the corresponding arms 224.

*Notched disk ratchet*

The shaft 183 carries a group of series of notched disks, ratchet disk 199 and gear 195 which is sometimes driven by sector 80. In order to eliminate a rebound when the mentioned elements are suddenly arrested at the time that they assume their differential positions a ratchet pawl 114 (see Figs. 2, 3, 13) is provided to engage the teeth of the said ratchet toothed disk 199. When shaft 183 and its associated moving elements are traveling to a differential position in the first pare of the operation of the machine the ratchet pawl 114 merely clicks over the ratchet teeth of disk 199 but when the time comes for rotating the said shaft 183 backwardly to restore it to normal position the said pawl 114 must be disabled.

Pawl 114 is loosely pivoted on a suitable frame supported stud, and its tail 200 is shaped so as to cooperate with a cam 201 rigidly mounted on a short frame supported shaft; the other end of said shaft is provided with a rigidly attached lever 202 which has a pin and slot connection with a lever 88 loosely mounted on a suitably located frame supported stud, which also supports the three armed lever 89. A suitably located spring 203 (see Fig. 1) frictionally holds arm 202 in any adjusted position. Near the upper end of lever 88 there is a stud extending through a slot in the link 113 which is connected to arm 110 driven by cam 67. Said lever 88 has a lower extension which is adapted to be moved by wipe pawl 87 under control of cam 68. At about the end of the first half of the operation and comparatively long after shaft 183 has assumed a differential position, arm 110 moves rearward thus causing link 113 to rock the upper end of lever 88 rearward thus disabling pawl 114 as shown in Fig. 3. At near the end of the operation of the machine wipe pawl 87 returns to its home position as shown in Fig. 12 thus rocking lever 88 clockwise and thus rotating cam 201 to restore pawl 114 to its normal engaged position with the ratchet teeth of disk 199.

*Independent variable notched disks*

It is frequently desirable to list and sum the independent variable along with the functions thereof. In order to effect such listing and summing, the shaft 183 (see Figs. 1, 2, 3, 12, 13 and 22) may carry a set of notched disks 228 to be read by fingers 227 connected with the actuators 105. As has been noted the said shaft 183 is moved through an angle commensurate with the setting determined by the S and F keys; hence the notches in said disks 228 represent the independent variable.

In some instances it is desirable, as will be explained hereinafter, to have a plurality of sets of disks 228 which are identical or which may differ somewhat for certain problems. In such an event there would be provided a plurality of sets of actuators for reading the independent variable notched disks 228.

If the machine is used for piece work wage computations one set of disks 228 may be utilized for governing the summing and listing of differing classes of manufactured articles, such as for example sub-assemblies of a more complex machine. Again for wage computations it may be sometimes convenient to accumulate the total time actually spent on productive labor for those individuals who have time out for lunch, whereas other employees will work through the noon hour as for example gate keepers, watchmen, firemen, etc., etc. In such an event the readings of one set of disks will differ from the corresponding readings of another by the length of the noon hour.

In the event that the device is used for a quantity and value register multiple sets of disks 228 may be used to segregate unrelated quantities as for example different grades and kinds of goods such as boots, shoes, findings, etc., etc.

Means are provided, as is fully described under the heading Trapping keys for disabling, or enabling, the actuators corresponding to any set of independent variable disks.

In some cases the independent variable disks are notched to govern the printing of numbers such as stock or catalogue numbers, whose sum would be meaningless, in the case of certain discontinuous functions as has been explained hereinabove.

Setting notched disks

The sets of notched disks as mentioned hereinabove comprise a series of mechanical representations of the precomputed numerical values of dependent variables in terms of a varying independent variable. Shaft 183 can assume a series of consecutive angular positions a certain number of which correspond to a series of consecutive values of the independent variable, such as for example those values of $x$ corresponding to integral values under heading Mechanical table, (see Table I) and the remaining positions corresponding to the values of $x$ indicated in the table under the heading Special values and interpolation (see Table II). Said shaft is under control of the argument keys for the purpose of determining the extent of rotation and hence a mechanical representation of the independent variable $x$. Associated with said shaft are the sets of notched disks certain of which are shown in Figs. 2 and 3 so that when the shaft is positioned under control of the argument keys the notched disks moving therewith are correspondingly positioned. Fixed to said shaft 183 is a gear wheel 195 meshing with sector 80 loosely pivoted on a stud 78. Under the heading Cam 68 it was described that member 77 travels forwardly due to the action of said cam 68 during the operation of the machine, and that the normal position of the elements is that illustrated in Fig. 12. When cam 68 begins to move a spiral spring 131 tensioned between shaft 183 and the rigid framework tends to rotate said shaft 183 and does rotate it until stopped by cooperating positioned stop levers on the disks 151 and 152 shown in Fig. 5. Such rotation causes sector 80 to partially follow member 77, see Figs. 12, 14 and 16.

In order to accurately determine the normal position of shaft 183 an adjustable wedge 196 is inserted between an arm of the sector 80 and bottom of the fork of member 77. Suitable means such as a screw is provided to hold wedge 196 in its adjusted position.

Connected to the system of links controlling sector 80 is a spring 197 which is connected to the lever 73 and tensioned in opposition to spring 131. Such an arrangement of springs substantially balances and neutralizes the force of the said springs on cam 68 so that there is substantially no tendency of the main cam shaft 64 to "run away" when sector 80 starts traveling upward, and also considerably reduces the resistance on the main cam shaft when spring 131 is being tensioned, at near the end of the operation of the machine.

Actuators

For the purpose of driving the totalizer wheels a series of elements known as actuators are provided. The actuators may have either of two forms, both of which are quite similar in function and operation. The first form is best shown in Fig. 10 and includes a series of suitably formed and contoured members 105 loosely pivoted on a supporting shaft 226. Each member 105 is provided with a suitably guided reading finger 227 attached by suitable connecting links at some convenient location thereon as illustrated. Said reading fingers are adapted to enter notches of precomputed depth in a series of notched disks denoted generally by character 228. Said reading fingers are preferably a short distance away from the outermost periphery of the notched disks when the actuators are in normal or home position. Certain of the actuators are connected by the transetting bars 214, 215, 216 and 217 so that other notched disks may be read by other reading fingers. Each member 105 is provided with an upstanding portion carrying an arcuate rack of special construction meshing with a plurality of series of intermediate idlers such as 229, 230 and 231. If desired the said arcuate rock may be offset to more surely avoid any undesired interferences, if such may develop, as indicated in said Fig. 10. In normal position which is that illustrated in Fig. 10 it is seen that said idlers are locked against turning by certain mutilated teeth. Said mutilated teeth are a special form of a Geneva lock which is provided to permit members 105 to travel a distance commensurate with the distance between normal position of the reading fingers and the highest reading position on the notched disks. Therefore said Geneva lock prevents such extraneous motion being carried to the totalizers through the said intermediate gears and thus guard against turning the totalizer wheels through a distance which is meaningless when interpreted as a calculation. Each member 105 is provided with substantially horizontal projections 232 and 233, the one 232 being an arm to connect with the type carriers (see Figs. 2 and 3) and the other to suitable springs 104' to normally resiliently urge the reading fingers 227 into reading position. The elements 105 combined with the plurality of idlers 229, 230 and 231 and the transsetting bars are called actuators.

The second form of actuators is shown in Figs. 2 and 3. This form of actuator is similar in all substantial respects except that a guided slidable rack 234 is substituted for the arcuate rack. Said straight rack is also provided with the Geneva mechanism as indicated. The second form of actuators is more readily adaptable to driving a large group of sets of totalizers inasmuch as all idlers may be identical.

A plurality of actuators constitute a set which may actuate one or more totalizers connectable therewith, so that a set of actuators will be common to a group of totalizers. Manifestly, a plurality of sets of actuators may be employed to actuate a set of groups of totalizers. Different arrangements of totalizers in sets and in groups will be further described hereinafter.

The above description taken in connection with the showing in Fig. 1 makes it clear that any desired plurality of sets of actuators can be utilized to read the independent variable from the notched disks mounted on shaft 183, for purposes which will be described in detail hereinafter.

*Transsetting of readings*

The function reel is towards one side of the machine, whereas the totalizer actuators are near the center of the machine as is illustrated in Fig. 1. The readings from a function set must be transset to the actuators so as to effect computations, and printing if the latter should be desired. Referring to Fig. 1, the set of actuators nearest the frame 53 is ordinarily used to effect accumulations of the readings of the function values. Fixed to certain of said actuators, viz, the units, the tens, the hundreds and the thousands are a series of independently movable transsetting bars 214, 215, 216 and 217 shown partly in Figs. 1, 2, 3, 10 and 23. Each of said bars are provided with suitably located arms of such size and shape as to avoid interference with each other in all possible positions and yet form generously dimensioned parts for supporting said bars 214, 215, 216 and 217 loosely on shaft 226. Each of said transsetting bars are provided with a plurality of suitably contoured forked arms 224 as best seen in Fig. 23. Said arm 224 is attached in any suitable manner to the corresponding transsetting bar so that its bifurcated end when in normal position lies in a position to receive a pin 225 connected to the corresponding denominational order functions reading finger 211 under control of a function selecting key 220. Each transsetting bar is provided with a many forked arms 224 as there are functions selecting keys 220 as shown in Fig. 1. Hence when a function selecting key is depressed the function reading fingers 221 are connected to the corresponding denominational transsetting bars 214, 215, 216 and 217 which in turn are joined to corresponding totalizer actuators so that the actuators may assume differential positions during an operation of the machine commensurate with the precomputed value of the selected function.

If additional capacity for reading a larger number of functions disks of a set is desired other transsetting bars can be utilized in the lower part of the actuators, as may be readily seen by an inspection of Figs. 2, 3, 10 and 23.

*Trapping keys*

It has been pointed out that there may be plural sets of actuators as is shown in Fig. 1 for operating different totalizers which may be mounted in a common frame as will be more fully described hereinafter. The different sets of actuators will be associated with different sets of notched disks carried by the shaft 183 as has been pointed out under the heading Independent variable notched disks. Sometimes it is desirable to permit only one set of actuators to operate a group of totalizers, in such case the remaining sets of actuators are disabled irrespective of their potential ability to read the values on the settable mechanical tables contained within the machine. Such disabling of certain sets of actuators is herein called trapping. A series of trapping keys three of which 40, 41 and 42 are diagrammatically illustrated in Fig. 1 are provided to trap corresponding sets of actuators. The mechanism associated with the trapping keys is substantially identical for all of them, hence description of one will suffice for the remainder. Referring to Figs. 1 and 23 it is seen that each trapping key is suitably guided near one end by the top cover of the machine and at the other end by an arm 43 rigid with trap 44 which is loosely pivoted on a suitably located frame supported shaft. Each trap 44 is in the form of an elongated latch which when the corresponding key is in raised position, latches over the ends 233 of a set of actuators. Hence when a trapping key is up the corresponding set of actuators is disabled and therefore the totalizers cooperating with said actuators will not be actuated during an operation of the machine.

Totalizers

The essential computing units of machines of this class are commonly called accummulators or totalizers. The machine herein described is constructed to accommodate a plurality of sets of totalizers; one set of totalizers is adapted to move as a unit during certain operations. A totalizer includes a series of toothed wheels arranged in consecutive denominational order, and a wheel of any particular denominational order has a number of teeth which is an integral multiple of the radix of its denomination. Thus if the totalizer is adapted to compute in the familiar decimal system each wheel has ten teeth or an integral multiple thereof; if the totalizers are adapted to compute in say, the British monetary system, certain wheels will have an integral multiple of twelve, and certain others an integral multiple of two; similarly for other systems, such as time comprising hours, minutes, etc. At this point a catalogue of the elements, substantially regardless of function will be given; the function of most of these elements will appear under transfer mechanism.

Each totalizer wheel element consists of a disk (see Figs. 17, 18, 19 and 21) to one side of which is attached at least one pin 236 and to the other side a gear wheel 237 so that the pin, the disk and wheel move as a unit. The said elements are carried in suitable spaced relations relative to each other by suitable hubs or collars on a shaft 238 which is supported by two main side frames 239 and 240. Arranged between said frames are a series of intermediate frames 241, one for each denominational order for guiding and locating a series of elements for each of said denominational orders. Each of said intermediate frames is provided with suitable openings through which a series of shafts or rods may be passed; thus rod 242 supports a spring urged aligning pawl 243 for each denominational order; rod 244 supports a tripping bellcrank lever 245, 246 for each order; shaft 247 carries a series of resiliently urged plates 248 having a limited extent of movement, which movement is limited by the length of a slot 249 in a companion intermediate frame through which extends a pin 250 rigid with said plate; shaft 251 carries a series of resiliently urged latches 252 adapted to cooperate with pins 253 on the aforesaid plates 248; said rod 251 also supports a series of levers 254 each provided a pin 255 for cooperating with a portion of the said latches 252 and also a resiliently urged transferring pawl 256 whose forward end is guided by flat prongs 257 rigid with said plates 248. Certain of the upper ends of the said levers 254 are bifurcated to straddle a companion pin 258 on the associated cam controlled rail 259. A bar 260 is provided to limit upward movement of pawls 256 when in a forward position.

Transfer cams

The transfer or tens carrying mechanism is of a type which is well described by the term positively actuated. Such a transfer mechanism must, unless unduly complicated, be arranged to effect a transfer in the lowest order first, then in the adjacent higher order, etc. progressively through the consecutive denominational orders in each totalizer. A representative cam has three levels; the first or intermediate level corresponds to a setting of the elements adjacent the totalizer wheels in either their tripped or their cocked position dependent upon the amount the said wheels have been turned; the highest position corresponds to a positive drawing forward of the universal transfer rail to cause the transferring pawl, if tripped, to advance a wheel one tooth space, and the lowest position corresponds to the final restoration of the elements adjacent the totalizer wheels to cocked position, but not to a position where a revolving totalizer wheel can set the mechanism for a potential transfer. The transfer cams are of the type known as complemental or frog cams 272 and each is arranged to act upon a pair of arms 261 and 262 (see Figs. 17, 18 and 19) loosely pivoted upon the shafts 263 and 264 respectively supported by the main frame work of the machine. The said levers 261 and 262 are joined near their upper ends by a link 265 loosely supported on studs rigid with the said levers. The centers of the said studs and the centers of the lever supporting shafts 263 and 264 are always at the vertices of a parallelogram, thus generating a rocking motion for the movable sides of the parallelogram which can be more readily freed from undersirable accelerations due to necessary quick action and the consequent slow action on returning. Further this type of motion transmission is more nearly free from undesirable back lash or lost motion after the parts have been slightly worn after long usage. There are several instances of similar motion transmitting mechanisms in this machine so that this description will serve for all. One of the levers 262 has an extension to which is attached a universal rail 259 for actuating a series of denominational order of transfer mechanism for a group of totalizers to which the said transfer mechanism is connected by pins 258 located at suitable intervals.

All the transfer cams are rigidly mounted on a shaft 266 which is driven by a gear wheel 267 also rigidly attached thereto. Meshing with said gear wheel is a second or idler gear 268 rigid with a short frame supported jack shaft 269. A second gear 268 (see Figs. 14 and 16), also rigid with said jack shaft, meshes with the oscillatory sector 98. At near the beginning of the operation of the machine the said sector travels rearwardly thus turning the transfer cams relatively backward. Such backward turning is an idle movement and has no effect on the transfer mechanism except to operate it idly, for all transfer elements have been restored to normal cocked position previously. At near the end of the operation of the machine the said sector travels forwardly. During such forward travel of sector 98 the transfer cams first effect any necessary carrying and then recocks the elements as is fully described under the heading Transfer mechanism.

Transfer mechanism

In machines of this class it is necessary to provide means for advancing a totalizer wheel one step or tooth when a totalizer wheel of adjacent lower order completes an angular distance of movement corresponding to its radix. The transferring operation may be conveniently described as consisting of four steps or phases viz:—tripping or conditioning elements to effect a transfer; effecting the movement of the wheel to receive the transfer; recocking or reconditioning the elements to prepare for subsequent tripping; and normalizing or completely resetting the elements for a subsequent tripping.

Each totalizer wheel 237 (see Figs. 3, 17, 18, and 19) is provided with a single tooth or pin 236 commonly called the transferring tooth or pin. During an adding operation, member 237 may travel an angular distance corresponding to the denominational radix of its associated wheel from its normal or zero position, and in so doing it will interfere with arm 245 of the bell crank lever 245—246 and in so doing the said bell crank lever will be slightly rotated on its shaft and the arm 246 will depress pin 250 on plate 248 associated with the adjacent higher denominational order as shown in Fig. 17. Such movement of plate 248 and the pin 250 thereon moves pin 253 against the tension of spring 269 out of the corner of the step 270 on the latch 252 and the latter snaps to the position shown in Fig. 17 under the action of said spring 269. As soon as pin 236 passes beyond arm 245 the plate 248 is revolved slightly to take up the predesigned clearance and the described elements assume the position shown in Fig. 18. The described rotation of plate 248, due to the shape of its upper edge, permits the pawl 256 to fall or drop (compare Fig. 3 with Fig. 17) because of its weight and in addition thereto the resiliency of a suitably positioned spring anchored to said pawl 256 and to the lever 254 and coiled about the pivot between the said pawl and lever. The transfer elements are new tripped and the next higher denominational totalizer element will receive an added increment of movement at a predetermined time, as a consequence of the lower denominational wheel completing an angular movement commensurate with its radix.

At near the end of the computing cycle the cam shaft 266 with its rigidly attached complemental frog cams 272 will oscillate the parallel links 261 and 262 about their pivots 263, 264 through the antifriction rollers attached to said links. The said cams travel in the direction indicated by the arrows in Figs. 17, 18 and 19 during this period thus causing the rail 259 to first move in the direction towards said cams as is indicated most clearly in Fig. 18. Such movement of the rail 259 and attached pin 258 moves the bifurcated lever 254 in the same direction carrying the attached transferring pawl 256 along correspondingly. The shape of the cams 272 is such that the said pawl 256 is moved a sufficient distance to cause the said pawl to engage an interdental space of the totalizer wheel of adjacent higher order from the tripping wheel and move said higher order wheel a distance of one tooth space against the aligning action of the associated resiliently urged aligning pawl 243 as is indicated in Fig. 18. The bar 260 is so located as to prevent over-rotation of the moving wheel and is yet in a position not to interfere with the withdrawal of the pawl 256 from the moved wheel after transferring has been effected. The rises on the cams 272 which cause the described movement are progressively delayed so that the lowest or tens order totalizer wheel will receive a transfer, if one should properly occur; and when said wheel has reached about the position shown in Fig. 18 the next higher order wheel, the hundreds, will then be in readiness to receive its transfer, and so on to the highest order. Transferring having now been effected, the parts are ready to be recocked or repositioned for a subsequent tripping.

At near the extreme end of the computing cycle the above-mentioned cams 272 assume the position shown in Fig. 19; that is, the rail 259 is shifted away from the said cams in an amount corresponding to the extreme difference in level between the highest and lowest parts of the periphery of said cams, as indicated by a comparison of Figs. 18 and 19. Such movement is of an extent to always insure a sufficient elevation of the forward end of latch 252 to permit pin 253 to travel under the influence of spring 269 from step 271 to step 270 of the said latch 252; the movement of said latch is effected by an interference between pin 255 rigid with lever 254 and the upstanding arm of the said latch 252. The pawl 256, the plate 248, and bell crank trip lever 246 are now latched in their normal or locked positions, but a turning totalizer wheel could not cause plate 248 to be latched in tripped position because spring 269 cannot move latch 252 due to the interference between pin 255 and arm of latch 252.

Further movement of the cams 272 causes arms 261 and 262 to move the rail 259 towards said cams to the position shown in Fig. 17, thus freeing latch 252 for a necessary downward movement under influence of spring 269 when tripping subsequently occurs. By means of the mechanism described applicant provides an essentially positive and an extremely reliable and simple mechanism for performing a necessary and difficult operation required for successfully effecting computing.

Totalizer aligning pawls

When the totalizer wheels are out of control of the actuators it is necessary to securely hold them in their adjusted position, and when the actuator control is reestablished, it is necessary or desirable to remove the said holding means.

Figs. 2, 17 and 18 illustrate the wheels of one set of totalizers out of mesh or control of their actuators. All said figures illustrate resiliently urged pawls 243 mounted on shaft or rod 242 cooperating with an interdental space of the totalizer wheels thus securely holding them against accidental or inadvertant movement. When the wheels are under control of the actuators as shown in Figs. 3 and 17 the said pawls are shown withdrawn from cooperation with said wheels.

The method of establishing and disestablishing control of the totalizers with their actuators is to rock the frame carrying a set of totalizers about the rod 251 as a pivot, thus meshing and unmeshing the totalizer wheels with the intermediate gears 230 of the actuators. The mechanism for moving the totalizer frame is fully described under the heading Rocking totalizer frame herein. The side plates of the totalizer frame have bearings for an eccentrically mounted rectangular shaft 274 to which is fixed a pair of bifurcated arms 275 each of which straddle a fixed pin 276 (see Fig. 21) on the main framework frame 53. Movement of the totalizer frame therefore causes a relative turning movement of the rectangular shaft 274, hence if the tails of the pawls 243 are suitably proportioned and contoured the said pawls will be withdrawn from the wheels on downward movement of the totalizer frame and reengaged on upward movement of the same. The said tails of the pawls 243 are preferably formed so that disengagement does not occur until the totalizer wheels have been lowered an extent such as to be fully under control of the said intermediate wheels of the actuators. Thus the totalizer wheels are never free to be subject to accidental or other uncontrolled movements.

Totalizer arrangement

The machine herein described is provided with a plurality of groups of sets of totalizers. Each totalizer frame carries a set of totalizers and there are a plurality of totalizer frames. One set, the rearmost set shown in Figs. 2 and 3, may be conveniently designated as the grand total set, the intermediate set may be designated as the itemizing set, and the forward groups may be designated as the special sets. It is to be understood that the designations assigned to the sets of totalizers are arbitrary and that any set may have any of the assigned or other designations.

Manifestly, the machine may be provided with only a single set of totalizers, two sets of totalizers, three sets of totalizers or more if desired. Further, each set may consist of a single totalizer, two totalizers, three totalizers or more if desired (see heading Some typical accounting problems). Each totalizer is contemplated as an accumulating unit, arranged to accumulate separately from other accumulating units of the same set or other set of accumulating units, as distinguished from the so-called "split" totalizer or accumulating unit.

Assuming the machine to be equipped for calculating a simple payroll which should show the total hours credited to each employee and the remuneration to be received by each, with the added result of total hours and total remuneration. In this case the machine would be provided with two groups of sets of two totalizers or four all together. The itemizing set would be used to compute the total hours and remuneration credited to each man from the data on his time cards and the grand set would compute the grant total of both time and remuneration.

Again assume the machine to be equipped for calculating raw stock orders in a production department. In this case the production department would find it necessary to order two classes of raw stock, the one in "shapes" such as bar iron, steel, brass, etc. and the other certain completely assembled subcomponents such as for example—in factory for manufacturing machines of the class described herein—ribbon mechanisms, cam assemblies, or other such subcomponents as may be supplied by the trade. The production department makes its orders to show price of the different sizes of raw stock and also the weight thereof. Such an order or rather series of orders would be computed from the production requirements of customers orders. In this case the order to each jobber supplying raw stock must show totals of weight and price of raw stock and weights and price of completed subcomponents. The raw stock totals would be computed in the itemizing set of totalizers; the special totalizers would compute the similar quantities for the subcomponents; and the grand set would compute the grand total for the entire group.

Manifestly, a legion of other adaptations between the two examples assumed including those indicated hereinabove can be readily solved by a choice in the number of totalizers in each set and the number of groups of sets of totalizers.

In each case certain totals are necessary or desirable, thus the machine should be capable of furnishing totals from the special set of totalizers, from the itemizing set of totalizers, and from the grand set of totalizers.

*Provisions for increasing the number of totalizers*

Hereinabove the device of this application has been described as comprising an indefinite number of sets of totalizers, and an indefinite number of groups of totalizers. Such indefiniteness has been premeditated inasmuch as the mechanism is capable of containing as many sets and groups of totalizers as may be useful in practical applications. Certain of the drawings have been made as from a machine containing only two groups of totalizers whereas others have been drawn as from a machine having three groups of totalizers. The drawings having a single line X—X are of the former class and those having two X—X lines are of the latter class. In case a machine is desired with a greater number of groups of totalizers the elements cut by such lines are to be understood as lengthened at about such a cut or as lengthened between such cuts. It is of course understood that the main frames are to be included in such cuttings, as indicated in Fig. 1. Similarly the number of totalizers in a set can be increased by adding the necessary mechanism between the lines Y—Y in Fig. 1. A perusal of the drawings will show that a relatively small number of parts need be altered in passing from one size of machine to another. Further the mechanism included between a pair of X—X lines is substantially independent of the mechanism of a smaller size machine, as can be seen by a perusal of the figures containing mechanism between such lines. Hence applicant has shown and described means for easily changing from one size of machine to another without effecting a complete redesign of substantially the entire mechanism as is so frequently necessary in machines of this class.

*Rocking totalizer frame*

For effecting computations the totalizer wheels must be connected at certain periods with the actuators as has been pointed out herein. In order to effect such connection the frame carrying the totalizer wheels must be raised and lowered. Further it is desirable that such lowering be positively determined in extent and also that the extreme positions be accurately determined. The mechanism for effecting such movement is shown diagrammatically in Fig. 21. Said figure may be considered generic for the different sets of totalizers of the various groups of sets which occur in the machine. Certain of the elements in said Fig. 21 have been distorted somewhat in size for the purpose of more clearly exhibiting the operations of the parts. The totalizer wheels 237 mounted on shaft 238 are carried by the pivoted side frames 239 and 240 rocking about trunnions near the extreme ends of shaft 251. Said side frames support a rod or bar 247 somewhat longer than the distance between the said side frames, and its extreme ends pass through cam slots 280 in the pivoted members 281. Said cam slots are of such form and shape as to provide dwells at their ends and a sloping intermediate section. When members 281 are in the position shown in the said Figure 21, the wheels are disconnected from their actuating elements as a consequence of the fact that the rod 247 is supported by the pair of the dwells of the cam slots 280 nearest the pivots of the said members 281 and when the members 281 are shifted so as to cause the rod 247 and therewith the totalizer frame, to be supported by the other pair of dwells which are further from the pivots of said members 281, the totalizer wheels are in cooperation with their respective actuating elements. Members 281 are constrained to move in unison by means of the pair of links 282 connected to cranks 283 rigid with a jack shaft 284 suitably supported in a suitable manner by the rigid framework of the machine. One of the camming members 281 is rigid with a short shaft 285 suitably supported by the rigid framework; also rigidly connected with said shaft 285 is a hub 286 having a pair of arms 287 and 288. The arm 287 is adapted to be straddled on occasion at one end by a specially constructed fork 289 carried by the movable shaft or rod 112. Hence transverse movement of said shaft or rod 112 will rock cam members 281 so as to lower and raise the totalizer frame 239–240. Similarly arm 288 can be moved downward on occasion to lower the totalizer frame. Such use of the arm 288 will be more fully considered under the various total key headings. Flat spring 290 is provided with a suitably formed protuberance 290' cooperating with suitably located depressions in a main frame to resiliently hold the above described elements in the positions corresponding to connected and disconnected positions of the totalizer wheels. By virtue of the dwells at the end of the cam slots 280 the extent of movement of the totalizer wheels into and from either position is accordingly determined irrespective of a certain amount of lost motion or back-lash of the elements cooperating with arms 287 and 288 on hub 286.

*Automatic rocking of totalizers*

As has been noted elsewhere herein computing requires the operation of connecting and disconnecting the wheels of a totalizer with its actuators. Further, such connecting and disconnecting must occur at different times according to the type of computation effected. Two cases will be considered; the first is the automatic connecting and disconnecting which occurs during adding and the second is automatic disconnecting which occurs during totaling after a totalizer or set of totalizers have been manually connected with their actuators. Case 1 will be described first.

It has been pointed out herein (see Rocking totalizer frame) that stub shaft 285 (see Figs. 21 and 14) may receive oscillatory movement to cause the wheels of a totalizer to be connected with and disconnected from their respective actuators. There are provided a plurality of such stud shafts designated as 285, 285' and 285'' in Fig. 14, each shaft being identified with a particular set of totalizers mounted in a common frame. The shaft 285, 285' and 285'' are provided with downwardly extending arms 287, 287' and 287'' respectively which on occasion are straddled by specially constructed forks 289, 289' and 289'' respectively supported variously on a shaft or bar 112. Said shaft or bar 112 is shifted rearwardly by a cam driven arm 110 after the actuators have assumed definite predetermined differential positions. Such movement of the variously supported special forks 289, 289' and 289'' rotate the stub shafts 285, 285' and 285'' clockwise, as viewed in Fig. 14, if said forks are straddling the corresponding downwardly extending arms. If certain of the forks are not straddling the corresponding downwardly projecting arms, the corresponding set of totalizers will of course remain in disconnected position. After the totalizer wheel actuators have returned to neutral or normal, cam controlled arm 121, Fig. 20, moves forwardly and pulls the shaft or bar 112 to home or normal position thus disconnecting that set or those sets of totalizers which may have been automatically connected with the actuators. It it thus seen that to and fro movement of member 112 admirably effects the necessary connection and disconnection of those sets of totalizers corresponding to a straddling of a special fork with the corresponding downwardly extending arm.

The second case will be now described. In this case a set of totalizers have been manually connected with the actuators in any convenient manner such as the depression of a suitable key and the machine automatically disconnects them. Each shaft 285, 285' and 285'' is provided with an arm 291, 291' and 291'' respectively, each of which is provided with a pin which extends through an elongated slot in the associated lever 292, 292' and 292''. Each of said levers is loosely mounted at its upper end on a stud rigid with the main framework of the machine. At the lower end each of said levers is provided with an antifriction roller, see Fig. 21. When a set of totalizers are manually connected with their actuators the specially formed fork associated therewith is disconnected from the associated downwardly extending arm by suitably constructed means described elsewhere herein, (see for example disabling fork 289''). A selected set of totalizers is manually engaged by rotating the associated shaft 285 (say); such rotation causes the lower end of connected lever 292 to travel forwardly thereby positioning its antifriction roller in proximity to the longer flange of the corresponding fork 289. Hence when the member 112 is shifted rearwardly by the cam operated lever 110 the manually connected set of totalizers will be automatically disconnected from their actuators when the said actuators have assumed definite predetermined differential positions. The return movement of member 112 is idle because the set of connected totalizers have been disengaged on the first movement of the said member.

*Special forks 289, 289' and 289''*

Under the heading Automatic rocking of totalizers mention was made of certain special forks 289, 289' and 289'' (see Figs. 14, 15 and 20) supported variously on a shaft or bar 112. As indicated, these forks are important means for connecting and disconnecting the corresponding sets of totalizers with their actuators. All the said forks are of similar construction which may be briefly described as a hub with spaced flanges both of which are mutilated, the one flange comprising approximately one third of an annulus and the other approximately one sixth of a similar annulus, as is illustrated in Fig. 15. Normally certain of said forks straddle the associated arms as is illustrated at 287', 289' and at 287'' 289''; the third fork is normally disengaged as indicated at 287, 289, see Fig. 16. Occasionally all three forks straddle the associated arms, again only one of them straddles its companion arm, and, finally none of them straddle their companion arms. The fork 289′ is rigid with member 112 and therefore partakes of all of its movements. Fork 289″ normally straddles its companion arm 287″ and is rigid with a sleeve 295 carried by member 112 so that it must partake of the translational movement of member 112 but not necessarily of its rotational movement. Fork 289 does not normally straddle its companion arm 287 and is rigid with a sleeve 296 carried by member 112 so that it also partakes of the translatory movement of said member but does not necessarily partake of its rotational movement.

The contemplated relative adjustments of the forks are indicated in the following table:—

| Fork 289″ Arm 287″ | Fork 289′ Arm 287′ | Forks 289 Arm 287 | Type of calculation |
|---|---|---|---|
| Cooperating | Cooperating | Disabled | Adding on two sets of totalizers. |
| Cooperating | Cooperating | Cooperating | Adding on all sets of totalizers. |
| Cooperating | Disabled | Disabled | Subtotaling. |
| Disabled | Disabled | Disabled | Totaling. |
| Disabled | Disabled | Cooperating | Transferring a total. |

The means for effecting cooperation between the different forks and corresponding arms, and also the means for occasionally disabling such connections is under control of a plurality of special keys and their associated mechanism.

Enabling fork

As has been described herein fork 289 is on a sleeve 296 carried by shaft or rod 112 but does not normally straddle the companion downwardly extending arm 287; hence the associated totalizers are not connected with the actuators during the translatory movements of shaft or rod 112. In order to cause said fork 289 to straddle its companion arm 287 the sleeve 296 to which said fork is rigidly attached is rotated an extent sufficient to effect such straddling. Said sleeve is provided with an elongated tooth 297 meshing in an interdental space on the rear (as viewed in Fig. 14) of member 298; (see Fig. 15 which clearly illustrates such mechanism). Said member 298 is constrained to move substantially rectilinearly by two headed studs rigid with the framework passing through elongated slots therein. Said member 298 is also provided with a pin overlying a lever 300 loosely pivoted on a stud also fixed to the main framework. A stud rigid with key 301 also overlies said lever 300. Hence depression of said key rocks the lever 300 and elevates member 298 thus rotating sleeve 296 and causing fork 289 to straddle the companion arm 287 for enabling the associated set of totalizers to be connected and disconnected with the actuators during the translation of member 112.

Disabling fork 289′

Occasionally it is necessary to disable fork 289′ and hence the associated set of totalizers. Since said fork 289 is rigidly affixed to member 112 a rotation of said member will disable said fork; accordingly member 112 is provided with an element 311 rigid therewith having a long tooth cooperating with an interdental space on the rear (as viewed in Fig. 14) of member 312. Said member is constrained to move substantially rectilinearly by a pair of headed studs rigid with the main framework passing through elongated slots in said member. Said member is connected by a link 313 to a bell crank lever 314. Hence rocking of the said bell crank 314 by any means will draw member 312 downwardly, thus rotating member 112 to disable fork 289′.

There are a series of bell crank levers rotatably mounted on studs fixed to the main frame work, including the above mentioned, connected together by links, they are the levers 314, 315, 316, 317 and 318. Bell crank levers 315, 317 and 318 are connected by the link 320 at their lower ends. A short link 319 connects bell crank levers 314 and 315, and another short link 321 connects bell crank levers 316 and 317. In view of the described link connections the five mentioned bell cranks move in unison so that if any of them are moved by any means the member 312 will rotate member 112 and disable fork 289′. Each of the bell crank levers 315, 316, 317 and 318 are provided with suitably located studs so as to be contacted by the feet of the keys 307, 310, 308 and 309. Hence depression of any of said keys will disable fork 289′ by the mechanism described.

Disabling fork 289″

Occasionally it is necessary to disable fork 289″ and hence the associated set of totalizers. Since the said fork 289″ is rigidly affixed to the sleeve member 295 a rotation of said member 295 will disable said fork; accordingly said member is provided with a long tooth 302 cooperating with an interdental space on the rear (as viewed in Fig. 14) of member 303. Said member is constrained to move substantially rectilinearly by a pair of headed studs rigid with the main framework passing through elongated slots in the said member 303. Hence downward movement of member 303, however effected, will rotate sleeve 295 and thus disable fork 289″. Member 303 is adapted to be forced downwardly by a stud rigid with bell crank lever 304 loosely pivoted on a stud fixed to the main framework of the machine. Two other similarly mounted bell crank levers 305 and 306 are connected at their lower ends by a pin and slot means to the link 307 pivoted at the lower end of the first mentioned bell crank 304. The extreme horizontal ends of the bell cranks 304, 305 and 306 underlie pins 122 respectively rigid with the keys 307, 308 and 309 respectively. Hence depression of any of said keys will rock bell crank lever 304 and force member 303 downwardly to rotate sleeve 295 thus disabling fork 289''.

*Restoring disabled forks to normal*

Hereinabove, means have been described for rotating the members to which certain forks are rigidly affixed. After the occasion for necessitating such rotation has passed it is necessary to restore the rotated forks to normal straddled position.

It has been pointed out herein that bell cranks (see Fig. 14) 314, 315, 316, 317 and 318 are so connected as to move in unison, hence if any part of the system, such as link 319, is moved to normal, all elements connected therewith will also move to normal. Such movement is effected by providing said link 319 with a pin 321 lying in the path of movement of the upper end of lever 89 loosely pivoted on a stud rigid with the main frame. Said lever is provided with a downward extension provided with a suitable antifriction roller lying in the arcuate path of movement of the wipe pawl 87 mounted on oscillatory lever 86, which lever is oscillated by cam 68 (see heading Cam 68), when the said wipe pawl 87 travels rearwardly it interferes with and rocks lever 89 and therewith link 319 connected to the bell crank lever system. Bell crank 316 of the said system is provided with a pin underlying slidable member 303; hence the raising of said pin causes the sleeve 295 to rotate and to return fork 289'' to normal. At the same time bell crank lever through link 313, 314 will return to normal elevated position the member 312, thus restoring fork 289' to normal. Since the studs in the bell crank system or chain underl:e the feet of the keys 307, 310, 308 and 309, all said keys are thereby restored to normal also.

*Totalizer timing*

In order to effect the desired forms of computation the totalizer wheels must be connected with their respective actuators at different periods relative to the directions of excursions of the said actuators. Thus for the purpose of adding amounts prede'ermined by the angular positions of the notched disks on shaft 183 the sets of totalizers, or groups of sets of totalizers, as the case may be are held out of connection with the actuators while the latter move to positions determined by the prepositioned notched disks during the first half of a cycle of operat'on of the machine. At about the beginning of the second half of a cycle of operation of the machine the said set of totalizers or groups of sets of totalizers are connected with the actuators and they remain connected therewith during the time that the actuators move to normal position. After said actuators have reached normal position the said set of totalizers or groups of sets of totalizers are disconnected from the said actuators, thus causing said set of totalizers or groups of sets of totalizers to measure the extent of displacement of the actuators from their normal position.

In taking totals, one and only one set of totalizers may be connected with the actuators during the first half of a cycle and such set must be one such that only one totalizer wheel is in engagement with an actuator, and the periods of connection with the said actuators are exactly the reverse of those for adding. Thus the set of totalizers are connected with the actuators during the first half cycle of movement and disconnected during the second half cycle. Hence the actuators move forward distances commensurate with the angular displacement of the corresponding totalizer wheels from their normal positions, and since the said totalizers wheels are turned to normal position and then disengaged they remain at normal or zero position.

In taking a subtotal the same restriction as to connection of sets of totalizers with their actuators holds as in taking totals. In this case the set of totalizers are connected with the actuators and remain in connection therewith during the time that said actuators are under a cons'raint to move during an operation of the machine. Hence even though the wheels of the set of totalizers have been moved to normal or zero they are brought back to their original positions.

In a non-add operation the totalizer or set of totalizers remain in the normal disconnected position while the actuators are under a constraint to move during an operation of the machine. A description of the mechanism for effecting the above recited operations follows.

*Total keys*

In order to print totals from the groups of sets of totalizers there are provided a series of total keys, a total key for each set of totalizers and a subtotal key for at least one set of totalizers. The total keys are shown in Figs. 14 and 16. Key 307 is conveniently designated the grand total key and as the name implies it is associated with the set herein denominated as the grand totalizers. Key 310 is also associated with the grand set of totalizers and is utilized for recording subtotals from the grand set of totalizers. Key 308 is a total key associated with the set herein denominated as the itemizing set of totalizers, and key 309 is total key associated with one of the sets herein denominated as the special set of totalizers. Key 301 is a key for selecting a special set of totalizers for calculating operations.

The term total key implies, and it is so intended herein, that when such a key is depressed it causes the associated set of totalizers to tend to yield its total and that the wheels of said set of totalizers will tend to return to zero and remain in such zero position at the end of the operation. The word tend has been used in the preceding sentence, since mechanism will be described herein which will prevent one or more pre-selected totalizers of a set from yielding its total. (See Selective actuator trapping.)

The term sub-total key implies, and it is so intended herein, that when such key is depressed it causes the associated set of totalizers to tend to yield its total and that the said sets of wheels will retain their totals after the completion of an operation.

Certain of the total keys operate certain mechanisms which are universal to each of them; these universal mechanisms are the chain or system of links and bell crank levers described under the heading Disabling fork 289'; the system or chain of bell cranks dedescribed under the heading Disabling fork 289''; releasing the "zero stops" described under the heading Total keys release zero stops; enabling the printing mechanism described under the heading Total keys enable printing mechanism; and set certain mechanism to cause a distinctive sign to be printed in juxtaposition with the total printed. The specification of the total keys will now be described.

*Total keys release zero stops*

Normally the feelers 227 are stopped by the outside periphery of the notched disks 228 when the machine is operated idly. (See Figs. 2, 3 and 10.) When it is desired to take totals provision must be made to permit the feelers to move rearwardly free of all obstruction. The series of notches 366 in the notched disks is provided for this purpose; therefore when taking totals said slots must be positioned in the paths of the said fingers. This is accomplished as follows—the ratchet 199 is provided with a pin 367 (see Fig. 22 and Fig. 23) which is normally unobstructed, but when any total key is depressed the resiliently urged pawl 368 is displaced so that its lower end permits only a limited amount of rotation of the ratchet, 199, and such limited amount of rotation is such as to position the aforesaid notches 366 in the path of the actuator controlled feelers. Said pawl 368 is loosely mounted on a suitably located frame supported stud and biased normally to the position shown in Figs. 22 and 23 by a suitable spring connected between an arm on said pawl and a suitably located stud on the main frame. Turning of said pawl by its spring is limited by cam 369 rigid with a short frame supported shaft to which is also affixed the bell crank 315 of the system or chain of bell cranks 314, 315, 316, 317 and 318 shown fully in Figs. 14 and 16. Hence depression of any total key, by virtue of the movement of the said system or chain of bell cranks moves cam 369 and therefore causes the notches 366 on the notched plates to be positioned in the path of the actuator controlled fingers 227 so that the actuators will be stopped when and only when the totalizer wheels reach their zero or normal positions.

*Highest order zero stop*

During totaling the wheels of a totalizer are rotated backwardly and the said wheels are stopped on the upper square edges of the tripping levers 245 of the transfer mechanism. The highest order totalizer wheel does not need a transfer mechanism for there is no wheel to which a transfer can be stored; yet such wheel must be stopped at zero position when the machine is totaling. In order to provide for such stoppage the said highest order wheel is provided with a lever 370 (see Fig. 2) similar to levers 245 shown in Figs. 17, 18 and 19. Said lever 370 cooperates with a pin rigid with the dummy spring urged plate 371 and with a pin on the disk of the highest order wheel. Hence the movements of lever 370 is in all respects similar to that of the corresponding lever 245 shown in the said Figs. 17, 18 and 19. Hence the highest order totalizer wheel will be arrested in zero position the same as the remaining wheels.

*Machine locks total keys*

If a total key were depressed at such an inopportune time as sometime after the main shaft begins its movement, the proper sequence of operations of the normal cycle might be deranged. To guard against such a contingency the total keys are locked against operation shortly after the machine starts to operate. Under the heading Cam 68 it is stated that said cam (see Fig. 12) causes the stud carrying arm 100 to oscillate. Said arm 100 controls the movement of resiliently urged latch 325 which is normally held in the position shown in Figs. 12 and 14. When said arm 100 travels rearwardly, i. e. to the left very shortly after the machine starts operating, a suitable spring causes the rearward end of latch 325 to descend and engage projection 326 rigid with link 320 (see Fig. 14) which link is described as an element of a chain of bell crank levers movable by any total key under the heading Disabling fork 289'. Hence if this chain of bell cranks is locked the keys which are adapted to operate said chain are locked.

*Total keys enable printing mechanism*

As described elsewhere herein (Printing keys) the printing mechanism may be disabled so that a series of individual items entered into the totalizers will not be printed, inasmuch as such individual items do not necessarily form a desired part of the permanent record, it being desired to record the total of such items only; therefore means are provided to automatically effect printing when any total key is depressed.

Under the heading Printing mechanism there is described means for rotating the pawl 331 and shaft 330 (see Figs. 2, 3, 12, 13 and 25) for releasing the hammers for permitting them to strike the positioned type a precussive blow. Such mechanism includes a rotatable member 118 connected with said pawl 331 which member 18 is provided with a short pin 332 and a similar rotatable member 119 provided with a long pin 333. Loosely mounted on the said sleeve is an arm 335 provided with a flange 334 which may interfere with said pins 332 and 333 associated with members 118 and 119 respectively, so that if said arm 335 is moved forwardly said flange 334 will interfere with said pins and rotate the said members 118 and 119 to a position which will ensure the automatic release of the printing hammers and feeding of the record sheet and inking ribbon. In order to cause the said arm 335 to move forwardly any total key operates mechanism which will cause resiliently suspended latch 96 pivoted on the lower end of said arm 335 to engage pin 94 on forwardly moving link 85 which has been described under the heading Cam 68 and thus ensure a rotation of the said members 118 and 119. Under the heading Disabling fork 289' there is described a system of links and bell cranks shown in Fig. 14 to move in unison. The link 320 of said system is provided with a pin 320' which when moved rearwardly rocks bell crank lever 327, loosely pivoted on a conveniently frame supported stud, to rock anti-clockwise as viewed in Figs. 12, 14 and 16 and thus cause a pin carried thereby to lower the resiliently supported latch 96 so as to connect arm 335 with the forwardly moving link 85, thus insuring a release of the printing hammers during a total printing cycle.

*Totaling the special totalizers*

The total key 309 (see Figs. 1, 14 and 16) tends to cause the set of special totalizers to yield their total when the machine is operated after said key is depressed. Said key is provided with elongated slots through which pass suitably located frame supported studs to insure substantially rectilinear motion. Rigid with said key is a stud which when the key is depressed rocks bell crank lever 306 of the system including bell cranks 304, 305 and 306 to rotate sleeve 295 and thus disable the fork 289" and hence the grand set of totalizers. Another stud rigid with said key during its downward movements, contacts with and rocks arm 288 rigid with shaft 285 to rock the special set of totalizers into connection with their respective totalizer wheel actuators so that the totalizer wheels are connected with the said actuators during the first motion thereof as required by the theory and practice of taking totals as set forth under the heading Totalizer timing. The foot of said key is broadened so as to rock bell crank 318 of the system or chain including members 314, 315, 316, 317 and 318. The bell crank 315 which is fast to a stub shaft releases the zero stop to permit the actuators to assume differential positions commensurate with the adjustment of the special set of totalizers. Said bell crank also causes the shaft or bar 112 to rotate, thus disabling fork 289' and hence the itemizing set of totalizers. Link 319 and pin 321 moving therewith come into the range of action of lever 89 so that the elements displaced by the depression of key 309 will be returned to normal at near the completion of the operation of the machine. Moved link 320 causes a pin thereon to rock bell crank 327 to cause the printing hammers to be fired.

After the types have been positioned cam driven arm 110 causes the type carriers to be locked in adjusted position and then moves shaft or bar 112 rearwardly; the said set of special totalizer wheels have now been turned to normal or zero positions. Such movement of shaft or bar 112 causes prong or fork 289 on sleeve 296 to contact with the antifriction roller at the lower end of arm 292 and thereby releases the normalized or zeroized set of totalizers from their actuators.

After the return of the actuators to normal or home position cam driven arm 121 moves shaft or bar 112 forwardly to restore it to normal position, see Fig. 20.

*Totaling the itemizing totalizers*

The total key 308 (see Figs. 1, 14 and 16) tends to cause the set of itemizing totalizers to yield their total when the machine is operated after said key is depressed. Said key is provided with elongated slots through which pass suitably located frame supported studs to insure approximate rectilinear motion. Rigid with said key is a stud which when the key is depressed rocks bell crank lever 305 of the system including the bell cranks 304, 305 and 306 to rotate sleeve 295 and thus disable fork 289" and hence the grand set of totalizers. Another stud rigid with said key during its downward movement, after the disabling of said fork 289" contacts with and rocks arm 288' rigid with shaft 285' to rock the itemizing set of totalizers into connection with the respective totalizer wheel actuators so that the totalizer wheels are connected with the said actuators during the first motion thereof as is required by the timing of totalizers for causing them to yield their totals, as set forth under the heading Totalizer timing. The foot of said key is broadened so as to rock bell crank 317 at about the time the first mentioned pin acts on the above described system of bell cranks of the system or chain including bell cranks 314, 315, 316, 317 and 318 and the links 319 and 320. The bell crank 315 which is fast to a stub shaft releases the zero stop to remove all obstructions from the actuators so that they will be limited in differential positions corresponding to the adjustment of the itemizing set of totalizers. Said bell crank 317 also causes the shaft or bar 112 to rotate thus disabling fork 289' so that the pin in the path of arm 288' on the said total key can connect the associated set of totalizers with the actuators. Link 319 and pin 321 moving therewith come within the range of action of lever 89 so that the elements displaced by the depression of the total key will be returned to normal position at near the end of the operation of the machine. Moved link 320 causes a pin carried thereby to rock bell crank 327 to cause the printing hammers to be fired.

After the types have been positioned arm 110 driven by cam 67 causes the type carriers to be locked in adjusted position and then moves shaft or bar 112 rearwardly, after the said set of itemizing wheels have now been turned to normal at zero position, and such movement of shaft or bar 112 causes a prong of fork 289' on shaft 112 to contact with the antifriction roller at lower end of arm 292' and thereby releases the zeroized or normalized set of totalizers from their actuators.

After return of the actuators to normal or home position cam driven arm 121 moves shaft or bar 112 forwardly to restore it to normal position.

Grand total key

The grand total key 307 (see Figs. 1, 14 and 16) tends to cause the set of grand totalizers to yield their total when the machine is operated after said key is depressed. Said key 307 is provided with elongated slots through which pass suitably located frame-supported studs to insure approximate rectilinear motion. Rigid with said key is a stud which when the key is depressed rocks bell crank lever 304 of the system including the bell cranks 304, 305 and 306 to rotate sleeve 295 and thus disable fork 289''. Another stud rigid with said key during the downward movement, after the disabling of said fork 289'' contacts with and rocks arm 288'' rigid with shaft 285'' to rock the grand set of totalizers into connection with the respective totalizer wheel actuators so that the totalizer wheels are in engagement with the said actuators during the first motion thereof as is set forth under the heading Totalizer timing in describing totaling. The foot of said key is broadened so as to rock bell crank 315 at about the time the first mentioned pin acts on the above described system of bell cranks of the system or chain including bell cranks 314, 315, 316, 317 and 318 and the links 319 and 320. The bell crank 315 which is fast to a stub shaft releases the zero stop to remove all obstructions from the actuators so that they will be limited in their motions by backward turning of the sets grand total wheels when the single teeth or pins 236 thereof contact with the upper squared end of the corresponding bell cranks 245 shown in Figs. 17, 18 and 19. Said bell crank also causes the shaft or bar 112 to rotate, thus disabling fork 289' and the associated itemizing set of totalizers prior to the engagement of the grand set of totalizers. Link 319 and pin 321 moving therewith come within the range of action of lever 89 so that the elements moved by said total key will be returned to normal at near the end of operation of the machine. Moving link 320 causes a pin 320' carried thereby to rock bell crank 327 to cause the printing hammers to be fired.

After the types have been positioned, arm 110 driven by cam 67 causes the type carriers to be locked in adjusted position and then moves shaft or bar 112 rearwardly, after the grand set of wheels have now been rotated to zero position, and such movement of shaft or bar 112 causes a prong of fork 289'' on sleeve 295 to contact with antifriction roller at the lower end of arm 292'' and thereby releases the zeroized set of totalizers from their actuators.

After return of the actuators to normal or home position cam driven arm 121 moves shaft or bar 112 forwardly to restore it to normal position.

Subtotal key

The sub-total key 310 (see Figs. 1, 14 and 16) tends to cause the set of grand totalizers or any other totalizers with which it may be associated to yield a sub-total when the machine is operated after the said key has been depressed. Said key is provided with elongated slots through which pass frame supported studs to insure approximate rectilinear motion. Said key is provided with a broadened foot to rock bell crank lever 316 of the system or chain including bell cranks 314, 315, 316, 317 and 318. The bell crank 315 which is fast to a stub shaft releases the zero stop to free the actuators so that they will be stopped on their initial motion by the totalizer wheels turning backwardly until stopped by their transfer mechanisms. Bell crank 314 also rotates shaft or rod 112 to disable fork 289' and hence the Itemizing set of totalizers. Link 319 positions pin 321 so that elements moved by the sub-total key will be returned to normal at about the end of the operation of the machine by movement of lever 89. Moved link 320 causes a pin 320' thereon to rock bell crank 327 to enable the printing mechanism. Said key 310 has a pin which interferes with a turned over portion of resiliently positioned curved lever 340 after the said system or chain of bell cranks and links have disabled fork 289'. Said lever is provided with a laterally extending pin 342 which cooperates with a pin 341 rigid with sleeve 295 carried by rod or bar 112, hence full depression of said sub-total key shifts the said sleeve 295 and also the bar or rod 112 rearwardly causing fork 289" to rock shaft 285" through the rigidly attached arm 287" and thus connect the set of totalizer wheels with their respective actuators during the initial motion thereof. When the actuators have been differentially adjusted under control of the respective totalizer wheels, the cam controlled arm 110 causes the type carriers to be locked in adjusted position and then moves rearwardly to move the rod or bar 112 correspondingly, but such motion is an idle one inasmuch as the said sub-total key 310 had previously moved said bar so that the grand set of totalizers remain connected with the actuators until they return to home position, when cam operated lever 121 moves forwardly and carries with it the shaft or rod 112, thus disconnecting the grand set of totalizers by rocking stub shaft 285" by means of the straddled fork 289". Hence the described operation causes the grand set of totalizers or any other set of totalizers with which said key is associated to tend to yield their totals to the printing mechanism and the said actuators are forced to reinsert the total into the said set of totalizers as has been indicated under the heading Totalizer timing.

*Selecting normal inactive totalizer*

Under the heading Enabling fork 289 means are described for rotating sleeve 296 (see Figs. 14 and 16) to which the special fork 289 is integrally attached. Said fork when enabled straddles arm 287 for the purpose of causing rocking of the associated special set of totalizers into connection and disconnection with the actuators. Said sleeve is rotated by the depression of a selecting key 301 which is guided by suitable frame supported studs so as to have a substantially rectilinear motion. Said key 301 is provided with a notch which may cooperate with the top frame of the machine to hold it locked in depressed position. The lower end of said key is provided with a pin overlying arm 360 of an upwardly spring biased bell crank lever 360—361 loosely pivoted on stud at the lower end of slidable member 298 which is moved upwardly by depression of said key 301 by means of lever 300. Such movement of said bell crank 360—361 moves it both vertically and rotationally. Such movement is of sufficient extent to remove pin 362 thereon out of the range of action of the bell crank lever 363 which is rocked on every operation of the machine. When the notch in the shank of key 301 is withdrawn from cooperation with the top cover of the machine, the spring attached to bell crank lever 360—361 forces the key upwardly and pin 362 is immediately below the nose of bell crank lever 363 which is loosely pivoted upon a suitably located frame supported stud and is connected to a rearwardly spring urged link 364 supported near the middle of the machine by an arm 365 loosely pivoted on the pin carrying bell crank lever 314. Said link is provided with a pin 322 lying in the path of movement of lever 89 which is moved as described under the heading Restoring disabled forks to normal. Hence bell crank 363 is rocked on every operation of the machine; and when the key 301 is released such movement will draw member 298 downwardly thus disabling the special fork 289 associated with a special set of totalizers.

*Selecting a totalizer common to a set and to a group*

Herein the totalizers have been described as arranged in sets and also as arranged in groups. Two sets of totalizers, herein denominated as the set of grand totalizers and as the set of itemizing totalizers, whereas the remaining sets are normally biased to non-adding condition. In order to select any set of the latter group of totalizers for operation it is necessary to depress the associated set selecting key 301. Herein certain keys denominated as trapping keys (see keys 40, 41 and 42 in Fig. 1) which are adapted to hold certain sets of actuators against operation are keys which may be denominated as disabling keys for groups of totalizers; for when a trapping key is in raised position its associated trapping latch 44 lies above all the forwardly extending arms 233 of a certain set of actuators thereby preventing effective movement of said set of actuators, and thereby preventing operation of the corresponding group of totalizers, see Fig. 23. Hence if all but one of the said trapping keys are in raised position all but one group of totalizers are disabled. If now a certain selecting key 301 is depressed all but one of the totalizers of the associated set are disabled, and that one corresponds to the free set of actuators. Hence any depressed trapping key such as 41 and any depressed selecting key 301 select the totalizer common to the operative set of totalizers and the operating group of totalizers. If now a plurality of selecting keys 301 are depressed and a plurality of trapping keys such as 40 and 41 are also depressed all totalizers common to the selected sets and groups will be in active condition. Such selection is frequently useful as is indicated under the heading Some typical accounting problems. Assume the existence of M groups of sets of totalizers with N totalizers in each set, there will then be N group selecting or trapping keys and M set selecting keys so that the total number of selecting keys is only M+N instead of MN as is commonly found in machines of this class.

Transferring totals

Means has been described for taking totals from any set of totalizers and means has also been described for selecting a special set of totalizers for actuation. The depression of a total key disables the special fork or forks associated with other totalizers normally operative to effect addition, but has no effect upon the forks of totalizers which are normally inactive. Hence, in the absence of special single key mechanism, a total key and a totalizer selecting key can be depressed and the machine operated. Such an operation causes the set of totalizers having their common total key depressed to tend to yield their total to the actuators and the totalizer selecting key causes its set of totalizers to be connected with the actuators which have been positioned under control of the set of totalizers being totaled; hence the selected set of totalizers will measure the differential positions of the displaced actuators or stated in other words the total or totals standing on one set of totalizers is or are transferred to another set of totalizers. Obviously any total on any set of totalizers may be transferred to any set of totalizers which are normally inactive.

Non adding

Under the heading of Totalizer timing the necessary timing of a set of totalizers to effect non-adding has been described. Non-adding has been incidentally described under the various total key headings when describing the action of a total key on the remaining sets of totalizers. Further certain special sets of totalizers are normally inactive and hence they may be described as normally biased to non-adding so that totalizer controlling keys are necessary to temporarily disable the normal bias. Again under the heading Trapping keys means has been described for disabling a set of actuators so that said actuators cannot transmit movement to the associated group of totalizers. Hence each trapping key constitutes a non add key for the corresponding group of totalizers irrespective of the particular totalizer controlling key in operative position.

Printing special characters

It is desirable to print certain special characters identifiable with the various total keys and selecting keys for sets of totalizers. Each of said keys is provided with a pin 372, see Fig. 22. In front of the said keys, as viewed in Fig. 22 is a slide 373 suitably supported by frame supported guides which is connected by link 374 to an upwardly extending arm of the skeletonized actuator 375. Said slide 373 is provided with a series of stops 376 arranged differentially to permit said plate to assume various positions under control of a depressed special key so that each special key determines a different extent of movement. Such varying extents of movement are under control of a spring 104' and the general operator 103 as are the totalizer actuators, and such extents of movement are transmitted through an idler lever 350 and a link 352 to a special type carrier 351 which is provided with a series of type which bear indicia corresponding to the different stops 376 of the key stopping plate 373 during an operation of the machine. As shown there are five special keys, but the number may be indefinitely increased by lengthening the elements cut by lines X—X as indicated hereinabove. In the event of such lengthening a corresponding number of special type are provided to identify the added keys. The printing hammer for the special types is fired with every operation of the machine except when blocked by pawl 331. Such firing does no printing because the plate 376 is normally free to move to its fullest extent with an operation of the general operator and in so doing a space devoid of special type is presented to the front of the corresponding printing hammer 355 hence no printing occurs. Hence any operation of the machine will be recorded and indicated when any of the special keys are depressed except when printing is ineffective and key S1 is depressed.

Printing mechanism

It is necessary or desirable to record certain amounts entered into the totalizers and all amounts abstracted from said totalizers. The printing mechanism is constructed to do such recording. The printing mechanism consists essentially of a series of type carriers operatively connected to the actuators (see Figs. 2, 3 and 22) and a series of hammers for each individual type carrier.

The rearwardly extending arm 232 of each actuator 105 is connected by a pin and slot connection with an idling lever 350 loosely pivoted upon a suitable frame supported shaft. Said idler levers are connected to the type carriers 351 by intermediate links 352. All the elements are proportioned so that the actuators 105 transmit equal increments of movement to the totalizers and substantially equal increments of movement to the type carriers. A series of intermediate levers including members 353 and 354 are provided for causing the printing of significant zeros. A cam 107 is provided to partially withdraw the hammers 355 from printing position and cam 91 to fully cock the printing hammers. The printing hammers are normally held in retracted position by a pair of latches 330 and 331 as shown in Figs. 1 and 23. After the type carriers have been positioned a series of pawls 356, one for each type carrier, are permitted to drop into suitably located notches on the stems of the type carriers which prevent further upward movement of the said carriers but permit relatively free downward movement; such pawls are necessary because the totalizers are occasionally disconnected from their actuators before printing occurs.

The printing mechanism is arranged so that the items entered into a selected group of totalizers are printed at the option of the operator, so that all items, some only, or none will be printed. Such division of the printing mechanism is effected by a plurality of spring urged latches 330 and 331 for holding the substantially horizontal arms of the printing hammers 355 against the tension of their springs 377. Any of said latches may be automatically removed from interference with the corresponding horizontal printing hammer arms under control of certain printing keys. The printing hammers are released after the type carriers have been differentially positioned which is also after the first operation of cam 68 and the first part of operation of cam 67. Hence cams 91 and 107 have been rotated from the positions shown in Fig. 2 to the positions shown in Fig. 3. Recocking cam 91 is under the control of cam 68 on the main shaft (see Fig. 12). Partial recocking cam 167 and pawl controlling cam 378 are directly under the control of cam 67 on the main shaft (see Fig. 13). Releasing of pawls 330 and 331 is under optional control; through the agency of the printing keys 379 and 380 and the various total keys; and of the said cam 67. The printing hammers 355 are held in normal cocked position against the action of their springs 377 by the clockwise resiliently urged latches 330 and 331 overlying an antifriction roller on a substantially horizontal arm of each printing hammer 355. Latch 330 (Figs. 12, 13, 22 and 25) is rigid with a frame supported shaft. Mounted on said shaft is a three armed member 119 which may have its upwardly extending arm in the path of pin 117 extending on both sides of link 115 which is moved rearwardly by cam 67 rigid with the main shaft 64 of the machine. Hence when said link moves rearwardly and pin 117 thereon interferes with member 119, said member will be rotated anticlockwise thereby withdrawing the corresponding latch 330 from interference with a group of the substantially horizontal arms of the printing hammers 355 so that they are free to impinge upon the positioned type.

Mounted on said shaft is a sleeve carrying rigid therewith the pawl 331. Connected with said sleeve is a three armed lever 118; which is similar to member 119; whose upper arm may also be in the path of pin 117 so that movement of said link 115 will release that group of printing hammers 355 normally held thereby.

*Main shaft control of printing mechanism*

Proper functioning of the printing mechanism requires that the printing hammers must be withdrawn and held in such position that they should be suddenly released so as to give a precussive blow to the positioned types. Let it be assumed that the printing hammers have struck the type as shown in Fig. 3. Cam 107 partially revolves and in so doing it contacts with antifriction rollers mounted on the substantially horizontal arms of the hammers 355, hence withdrawing them slightly from the position shown in said Fig. 3. Cam 107 is rigid with a frame supported shaft to which is also rigidly affixed an arm 116 (see Fig. 13) which is connected by the long link 115 operated by cam 67 on the main shaft. As stated hereinabove said cam 67 acts before the actuators start to return. Hence cam 67 slightly withdraws the printing hammers shortly after the totalizers have been connected with the actuators during adding or at the same relative time after the totalizers have been disconnected during totaling, then the type carriers are restored to normal. After the totalizers have been disconnected from their actuators and during the time transferring is taking place cam 91, (see Fig. 12) which is rotated by a lever 90 rigid therewith through link 85 connected to the mechanism driven by cam 68 on the main shaft 64, is rotated to the position shown in Fig. 12, thereby positioning the hammers in normal position for subsequent release. Latches 330 and 331 are resiliently urged against suitable stops to the position indicated in Fig. 25 so that the substantially horizontal arms of the printing hammers 355 can pass by said latches and they will snap into their normal holding position as shown. As noted above the printing hammers are released for printing after the totalizers are disconnected during totaling; hence the type carriers must be held in their adjusted positions before such disconnection. For effecting such holding the normally disengaged resiliently urged pawls 356 are permitted to engage suitably located notches in the type carrier under the influence of their respective springs, by a partial rotation of cam 379 which is driven by arm 378 connected by link 382 to arm 116 moving with cam 116, and hence under control of cam 67 on the main shaft 64 (see Fig. 13). Said pawls 356 are provided with suitable guiding flanges straddling the stems of the type carriers.

At near the completion of an operation of the machine slotted link 380 (see Fig. 12) connected to arm 381 rigid with cam 91, notches clockwise, thus rocking arm 378 and cam 378 rigidly attached thereto and thus disabling pawls 356 and permitting free upward movement of the type carriers 352 at the beginning of the next operation of the machine. Such rocking of arm 378 is possible because of the existence of a suitable clearance slot in link 382 as shown in Fig. 13.

*Automatic zero printing mechanism*

It is desirable that significant zeros should be printed whereas the insignificant zeros should be eliminated. Such control is effected by a series of resiliently urged latches 353, one for each printing hammer 355, loosely pivoted on a suitable frame supported shaft. Said latches are connected by suitable lugs or pins 383 so that if any one of them is rocked, all latches corresponding to lower denominational orders will be rocked by the moved latch while the latches corresponding to the higher denominations will not be disturbed. The extreme forward ends of the latches 353 interfere at times with the downwardly extending tails of the printing hammers 355. In describing the upward movement of the type carriers reference was made to the idler arms 350 interposed between the type carriers and the actuators. Each of said idler arms is provided with a suitable antifriction roller for partially rotating resiliently urged lever 354 by cooperation with the downwardly extending arm thereof; each of said levers has an antifriction roller near its upper end which cooperates with a cam surface on the lower edge of the corresponding latch 353. Assuming the latch 353 in a position such as to block the downwardly extending arm of the corresponding printing hammer 355, it is seen that any significant movement the idler lever 350 causes its roller to rock lever 354 and latch 353 as well as all lower denominational latches 353 through lugs or pins 383, to release the corresponding printing hammer for operation if either or both latches 330 and 331 should subsequently be operated. In order to eliminate undue interference during the time the hammers are cammed to cocked position and all latches 353 are simultaneously moved so that they will not impede the movement of either the idler levers 350 or of the hammers 355. All the said latches 353 are finally moved to a position shown in Fig. 2 by a universal cam member 384, see Fig. 3, pivotally supported by the main frames. Said member is provided with an upwardly extending arm 385 lying in the path of a projection 386 rigid with cam 91; a suitable spring and arm is provided to urge said arm 385 into contact with projection 386. Hence when the hammers are being restored to the position shown in Fig. 2 by cam 91, member 384 moves all latches 353 against the action of their springs to the position shown in the same figure. Hence at normal hammer cocked position there is a clearance between the downwardly extending tails of the hammers and latches 353 and also between said latches and levers 354. A fixed comb 387 (see Fig. 12) is provided to insure cooperation between the latches 353 and their corresponding hammers. The hammers 355 are also guided by a suitably located comb 388 as shown in Fig. 22.

*Printing keys*

Under the heading Printing mechanism means has been described for releasing the printing hammers for impingement against the positioned type, said means including the two members 119 and 118 connected with the clockwise resiliently urged wide pawl 330 and the wide sleeve pawl 331 respectively as shown in Fig. 25. The connection of said members 119 and 118 with the said shaft and sleeve respectively is one which permits a limited amount of free angular movement relative thereto. Such connections are similar, so that the description of the one suffices for both. Member 119 is rigid with a widely notched hub 387' (see Fig. 25) loose on shaft of wide pawl 330, passing through the said notch in hub 387' is a pin 388 rigid with said shaft. A suitable spring (see Figs. 12 and 13) extends between the rearwardly extending arm of member 119 and a suitably located frame supported stud which tends to rotate said member clockwise an angular distance determined by the arcuate length of the slot in the hub 387' of said member 119 and pin 388 rigid with said shaft of wide pawl 330. When said member 119 is permitted to rotate under the influence of the said spring, the upwardly extending arm of said member 119 is rotated clockwise sufficiently to permit pin 117 on link 115 to pass rearwardly without interfering with said arm of said member 119, hence wipe pawl 330 is not withdrawn from engagement with the horizontal arm of the hammers and no printing occurs.

Member 119 is provided with screw 389 on its hub cooperating with a slot at near the end of sleeve pawl 331. Said member 118 is provided with a similar spring which tends to rotate the said member 118 clockwise sufficiently to withdraw its upwardly extending arm from the path of pin 117 on link 115 so that the printing hammers controlled by pawl 331 will not be released, hence preventing printing.

Also connected with the rearwardly extending arm of member 119 is an upwardly resiliently urged key 380 which is provided with a notch adapted to cooperate with the cover of the machine and thus be locked in depressed position (see Fig. 12). When said key is not locked down, a spring is free to turn member 119 clockwise so that its upwardly extending arm is out of the path of stud 117 on link 115. When said key is depressed, said member is turned anticlockwise sufficiently to cause pin 117 on link 115 to interfere with the forward arm of said member 119 and hence printing. Member 118 is similarly provided with an upwardly resiliently urged key 379 which when depressed rocks said member anticlockwise sufficiently to cause printing by the hammers controlled by the sleeve supported pawl 331.

The downwardly extending arms of said members 118 and 119 are provided with pins 332 and 333 respectively which lie in the path of a lug 334 on arm 335 loosely supported by sleeve of pawl 331, so that when said arm is rotated anticlockwise as described under Total keys enable printing mechanism the members 118 and 119 are correspondingly rotated sufficiently so that pin 117 on link 115 will cause printing.

Paper and ribbon feeding

The release of the printing hammers is effected by pin 117 on link 115 (see Fig. 13) rocking one or both members 118 and 119 anticlockwise. As shown in Fig. 25 each of said members 118 and 119 is provided with a pin 390 and 391, respectively which may contact with one or both prongs of a fork 379 rigidly attached to arm 120'. Hence movement of link 115 may rock lever 120 through the intermediate mechanism just described. Such rocking of lever 120 is utilized to feed the record strip and the inking ribbon. Connected to the said lever 120 is a link 392 shown in Fig. 13 which is attached to a pawl carrying platen feeding lever 393. The pawl 394 resiliently mounted thereon is adapted to feed the ratchet wheel attached to the platen roller on return movement of said lever. A suitable holding ratchet is provided to resiliently hold the platen in adjusted position. Inasmuch as this mechanism is largely of conventional form it need not be further described. Rigid with link 392 is a pair of pins between which passes a suitably pivotally supported inking ribbon feed lever 395, which is connected at its lower end to a link 396 jointed to the ratchet carrying lever 397 for rotating the ratchet wheel 398 which in turn is suitably geared to the ribbon spool shaft 399 which is turned on the return movement of said lever 120. A suitably located hold back pawl prevents retrograde movement of ratchet 398. A suitable form of ribbon reversing mechanism may be included in this mechanism if desired though none is hereby described. It is seen from the foregoing description that the paper and inking ribbon are moved during an operation of the machine when and only when the printing hammers are released to impinge on the type.

Link 115 (see Fig. 13) has been described as the means for rocking lever 120, such rocking is possible because pin 92 on link 85 has been previously withdrawn from contact with the lower extension 93 of arm 120. After link 115 and pin 117 have reached normal home position link 85 and pin 92 are traveling to home position thus effecting feeding of the ribbon and paper at near the end of a complete operation of the machine.

Some typical accounting problems

A few typical accounting problems, and computing problems will be given under this heading, the problems given are merely typical and are not exhaustive of the capabilities of the mechanism; applicant is frank to say that he does not now know the extent of the applicability of his mechanism and relies on his claims to protect his invention to all uses to which it may be put.

Pay roll accounting

One use to which this mechanism can be put is the computation of pay rolls involving a number of workmen with varying hourly, daily, weekly, etc. wage rates. Assume for example that certain time cards and pay roll rates show the following data

| Workman | In | Out | Rate |
|---|---|---|---|
| 53 | 8:30 A. M. | 4:00 P. M. | $1.25 |
|  | 8:45 A. M. | 4:00 P. M. |  |
| 57 | 8:15 A. M. | 3:45 P. M. | $1.00 |
|  | 8:00 A. M. | 4:00 P. M. |  |

In this case the "in" time is set on the S keys, the "out" time on the F keys, and the rate is set by rotating the reel and depressing the proper key. Operation of the machine is such that the following might be printed (see Printing keys);

```
    7:30     9.37
    7:15     9.06
   14:45    18.43  T
    7:30     7.30
    8:00     8.00
   15:30    15.30  T
            33.73  GT
```

In the above case no time has been allowed for luncheon, the machine can readily account for a luncheon period of given length. Assume a luncheon period of 45 minutes the above calculation could appear as

```
    6:45     8.13
    6:15     7.81
            15.94  T
    6:45     6.45
    7:15     7.15
            13.60  T
            29.45  GT
```

Commodity accounting

Assume now, as an example, a coal yard business the following data:

```
   3 tons soft        @  7.15
   1 ton nut anth.    @ 14.25
   2 tons stove  "    @ 14.50
```

In this case the "in" keys can be wholly dispensed with or they may set at zero as an "in" the record may appear as

```
       3      21.45
       1      14.25
       2      29.00
       6      64.70  T
```
or
```
   27  18  57  8143.00  GT
       3         21.45
           1     14.25
              2  29.00
                 64.90  T
       3   1  2
```

In the first instance it was tacitly assumed that a machine of the same size as used in the payroll problem was used whereas the second assumes a machine with at least a set of four totalizers for the itemizing set and as similar number in the grand total set. This is an application calling for plural sets of argument notched disks for segregating the amounts of different grades and varieties of coal as has been suggested under the heading Independent variable notched disks. Manifestly such may be extended to a somewhat more complicated system as indicated in the next example where plural sets of special totalizers are utilized.

*Departmental clerks, accounts*

Assume the following data.

```
   Clerk A   12# sugar     @  7½¢
         C   2 doz. eggs   @  37¢
         C   5 cans        @  23¢
         A   3½# meat      @  42¢
         B   8# sugar      @  7½¢
```

Such data may be tabulated as follows:
```
   12                    .90
        2                .74
            5           1.15
                3.5     1.47
   8                     .60
   20   2   5   3.5     4.86  T
   12           3.5     2.37  A
   8                     .60  B
        2   5           1.89  C
```

In this instance there is a group of totalizers for each commodity and a set of totalizers for each clerk therefore a grand total will show the grand total quantity of each commodity and a grand total of amounts received, the totals taken from each set shows the total of quantities of commodities sold by each clerk and the amount received by said clerk, thus indicating not only the total amount of money taken in by each clerk by the quantity and kind of merchandise sold by each.

As an illustration of an accounting problem, wherein a mechanically computed value or its function is not carried to the totalizers, let us assume an accounting problem of the payroll involving wage at an hourly rate for the regular day period, say $1.50 hourly wage rate and the regular day period from 8: A. M. to 4: P. M., and overtime wage rate at double regular time wage rate. Assume, for example, that a time card shows a working period from 8: A. M. to 6: P. M. Operating the machine, in the manner above stated, the listing respectively of the elapsed time and money value or wage, appear as follows:

```
      10:00    15.00
                3.00
      10:00    18.00  T
```

In obtaining the above listing and totals, the 8 "in" key is depressed, the 6 "out" key is depressed, the $1.50 wage key is depressed and the machine operated by its handle or equivalent, yielding the listing:

```
      10:00    15.00
```

For obtaining the overtime wage or money value, the 4 "in" key is depressed and the 6 "out" key is depressed, the $1.50 wage key remaining depressed, and setting the proper selecting key for deleting the time accumulators arranged in corresponding order, whereupon operating the machine the following listing appears: 3.00.

Accordingly, for obtaining the money value, in this instance overtime wage, the elapsed time of two hours of the overtime has been deleted so far as affecting the listing and the operation of any totalizer, but effecting the value of $3.00, its function, in the selected totalizer, to yield the total of $18.00. Upon operating the corresponding total or the ground total key, such total is printed.

In certain accounting problems it is desirable to separately total the overtime wage, the machine being operated to accumulate the overtime additionally in a separate totalizer, by setting the proper selecting key by set to accumulate the overtime wages in a separate totalizer, to derive and print the total of the overtime wage.

In a similar manner, any desired value set up on the keyboard or mechanically computed value and/or any function of the same may be deleted from the totalizers, by operation of the machine in a like manner. Similarly, separate accumulation of individual accounting items may be accumulated in individual accumulators separate from the gross values, to thereby derive the total of the same separately from the gross total.

In the claims I use such terms as function, independent variable, or argument dependent variable, indefinite sum, series, sets, factor, single entry, interpolation, addition Theorem for functions, invariant, these are mathematical terms. These terms are used because they are believed to correctly connote the capabilities of the mechanism described in the foregoing specification; further, I contemplate that these terms shall have the broad definitions accorded to them in the usual mathematical definitions as exemplified in such texts as Whittakers Modern Analysis, Goursat-Hedrick Mathematical Analysis, Rice-Interpolation and others of similar import.

Whereas I have described my invention by reference to specific forms thereof it will be understood that many changes and modifications may be made without departing from the spirit of the invention.

I claim:

1. A calculating machine comprising mechanism including sets of keys for mechanically performing a computation, means including a set of keys for deriving a function of the result of said mechanically performed computation, one or more sets of separately accumulating totalizers for accumulating respectively said results of successive mechanically performed computations and successively derived corresponding said functions, and means for optionally actuating or non-actuating said totalizers respectively to thereby at will accumulate substantially simultaneously both or either the respective computation results and the respective corresponding functions.

2. A calculating machine comprising mechanism including sets of keys for mechanically performing a computation, means including a set of keys for deriving a function of the result of said mechanically performed computation, one or more sets of separately accumulating totalizers for accumulating respectively said results of successive mechanically performed computations and successively derived corresponding said functions, and means for optionally actuating or non-actuating said totalizers respectively to thereby at will accumulate substantially simultaneously both or either the respective computation results and the respective corresponding functions, said optional means including separate keys for selectively actuating and non-actuating said respective totalizers.

3. A calculating machine comprising mechanism including keys for mechanically performing a computation, means including a set of keys for deriving a function of the result of said mechanically performed computation, one or more sets of totalizers, each set comprising a plurality of separately accumulating totalizer units, said totalizer units being arranged in corresponding order for accumulating respectively said results of successive mechanically performed computations and successively derived corresponding said functions, means for selecting any set or sets of said plurality of sets of totalizers and means for optionally actuating or non-actuating said totalizer units of the selected set or sets for accumulating at will both or either of the respective successive computation results and respective successive corresponding functions.

4. A calculating machine comprising mechanism including keys for mechanically performing a computation, means including a set of keys for deriving a function of the result of said mechanically performed computation, one or more sets of totalizers, each set comprising a plurality of separately accumulating totalizer units, said totalizer units being arranged in corresponding order for accumulating respectively said results of successive mechanically performed computations and successively derived corresponding said functions, means for selecting any set or sets of said plurality of sets of totalizers and means for optionally actuating or non-actuating said totalizer units of the selected set or sets for accumulating at will both or either of the respective successive computation results and respective successive corresponding functions, said optional means including keys for selecting said totalizers by sets and further including keys for selecting said totalizer units by order.

5. A calculating machine comprising mechanism including sets of keys for mechanically performing a computation, means including a set of keys for deriving a function of the result of said mechanically performed computation, one or more sets of separately accumulating totalizers for accumulating respectively said results of successive mechanically performed computations and successively derived corresponding said functions, means for optionally actuating or non-actuating said totalizers respectively to thereby at will accumulate substantially simultaneously both or either the respective computation results and the respective corresponding functions and printing mechanism for printing the selected computation result or corresponding function at any desired stage.

6. A calculating machine comprising mechanism including keys for mechanically performing a computation, means including a set of keys for deriving a function of the result of said mechanically performed computation, one or more sets of totalizers, each set comprising a plurality of separately accumulating totalizer units, said totalizer units being arranged in corresponding order for accumulating respectively said results of successive mechanically performed computations and successively derived corresponding said functions, means for selecting any set or sets of said plurality of sets of totalizers and means for optionally actuating or non-actuating said totalizer units of the selected set or sets for accumulating at will both or either of the respective successive computation results and respective successive corresponding functions, and printing mechanism for printing the selected computation result or corresponding function at any desired stage.

7. A calculating machine comprising mechanism including sets of keys for mechanically performing a computation, means including a set of keys for deriving a function of the result of said mechanically performed computation, one or more sets of separately accumulating totalizers for accumulating respectively said results of successive mechanically performed computations and successively derived corresponding set functions, means for optionally actuating or non-actuating said totalizers respectively to thereby at will accumulate substantially simultaneously both or either the respective computation results and the respective corresponding functions, printing mechanism for printing the selected computation result or corresponding function at any desired stage, and keys for optionally actuating or non-actuating said printing mechanism.

8. A calculating machine comprising mechanism including sets of keys for mechanically performing a computation, means including a set of keys for deriving a function of the result of said mechanically performed computation, means for simultaneously mechanically performing said computation and its said derived function, one or more sets of separately accumulating totalizers for accumulating respectively said results of successive mechanically performed computations and successively derived corresponding said functions, and means for optionally actuating or non-actuating said totalizers respectively to thereby at will accumulate both or either the respective computation results and the respective corresponding functions.

9. A calculating machine comprising mechanism including keys for mechanically performing a computation, means including a set of keys for deriving a function of the result of said mechanically performed computation, means for simultaneously mechanically performing said computation and its said derived function, one or more sets of totalizers, each set comprising a plurality of separately accumulating totalizer units, said totalizer units being arranged in corresponding order for accumulating respectively said results of successive mechanically performed computations and successively derived corresponding said functions, means for selecting any set or sets of said plurality of sets of totalizers and means for optionally actuating or non-actuating said totalizer units of the selected set or sets for accumulating at will both or either of the respective successive computation results and respective successive corresponding functions.

10. A calculating machine comprising mechanism including sets of keys for mechanically performing a computation, means including a set of keys for deriving a function of the result of said mechanically performed computation, means for simultaneously mechanically performing said computation and its said derived function, one or more sets of separately accumulating totalizers for accumulating respectively said results of successive mechanically performed computations and successively derived corresponding said functions, means for optionally actuating or non-actuating said totalizers respectively to thereby at will accumulate both or either the respective computation results and the respective corresponding functions and printing mechanism for printing the selected computation result or corresponding function at any desired stage.

11. A calculating machine comprising mechanism including keys for mechanically performing a computation, means including a set of keys for deriving a function of the result of said mechanically performed computation, means for simultaneously mechanically performing said computation and its said derived function, one or more sets of totalizers, each set comprising a plurality of separately accumulating totalizer units, said totalizer units being arranged in corresponding order for accumulating respectively said results of successive mechanically performed computations and successively derived corresponding said functions, means for selecting any set or sets of said plurality of sets of totalizers and means optionally actuating or non-actuating said totalizer units of the selected set or sets for accumulating at will both or either of the respective successive computation results and respective successive corresponding functions, and printing mechanism for printing the selected computation result or corresponding function at any desired stage.

12. A calculating machine comprising means for deriving an independent variable from a set of observations, said deriving means including a set of keys for initiating a mechanical representation of said set of observations, means for mechanically representing a plurality of functions of said independent variable, one or more sets of totalizers, each set comprising a plurality of separately accumulating totalizers arranged in a pre-determined order for accumulating successively derived independent variables and their corresponding functions respectively, keys for operating said totalizers selectively by sets of keys for operating said totalizers selectively by order.

13. A calculating machine comprising means for deriving an independent variable from a set of observations, said deriving means including a set of keys for initiating a mechanical representation of said set of observations, means for mechanically representing a plurality of functions of said independent variable, one or more sets of totalizers, each set comprising a plurality of separately accumulating totalizers arranged in a pre-determined order for accumulating successively derived independent variables and their corresponding functions respectively, keys for operating said totalizers selectively by sets and keys for operating said totalizers selectively by order, and means for indicating the computation or computations performed.

14. A calculating machine comprising a plurality of independently operable sets of keys, a plurality of sets of totalizers, each set comprising a plurality of separately accumulating totalizers in a pre-determined order, keys for initiating the operation of said totalizers selectively by sets and keys for initiating the operation of said totalizers selectively by group, and optional means for printing and non-printing the accumulations of the respective totalizers.

15. A calculating machine comprising a plurality of independently operable keys, a plurality of sets of totalizers, each set comprising a plurality of separately accumulating totalizers in a pre-determined order, keys controlling the printing substantially simultaneously and non-printing of said totalizers selectively by sets and keys controlling the printing and non-printing of said totalizers selectively by group independently of the printing and non-printing positions of said first named printing controlling keys.

16. A calculating machine comprising a plurality of independently operable keys, a plurality of sets of totalizers, each set comprising a plurality of separately accumulating totalizers in a pre-determined order, keys controlling the printing substantially simultaneously and non-printing of said totalizers selectively by sets, said printing controlling keys normally being in their non-printing positions, and keys controlling the printing and non-printing of said totalizers selectively by group independently of the printing and non-printing positions of said first named printing controlling keys.

17. A calculating machine comprising mechanism including sets of keys for mechanically performing a computation, means including a set of keys for deriving a function of the result of said mechanically performed computation, one or more sets of separately accumulating totalizers for accumulating respectively the results of successive said mechanically performed computations and successively derived corresponding said functions, printing mechanism, separate keys for controlling the printing and non-printing respectively of any mechanically computed result and any derived function and means including a key for effecting the printing of the totals of said totalizers at any stage operative independently of said printing and non-printing keys.

18. A calculating machine comprising mechanism including sets of keys for mechanically performing a computation, printing mechanism, key means controlling the printing and non-printing of any desired results of said mechanically performed computation mechanism, accumulator means adapted to accumulate any desired results of said mechanically performed computation mechanism, and key means for controlling the printing and non-printing of accumulations in said accumulator means independently of the printing and non-printing positions of said first-named printing controlling key means.

19. A calculating machine comprising mechanism including sets of keys for mechanically performing a computation, printing mechanism, key means controlling the printing and non-printing of any desired results of said mechanically performed computation mechanism, accumulator means, key means controlling the actuation and non-actuation of said accumulator means by said mechanically performing computation mechanism, and key means for controlling the printing and non-printing of accumulations in said accumulator means independently of the printing and non-printing positions of said first-named printing controlling key means.

20. A calculating machine comprising a plurality of independently operable sets of keys, a plurality of sets of totalizers, each set comprisng a plurality of separately accumulating totalizers in a predetermined order, keys for initiating the operation of a plurality of said totalizers selectively by sets, and keys for selecting by group any particular totalizer of the set selected by the operated set selective keys.

21. A calculating machine comprising a plurality of separately operable sets of keys, printing mechanism, key means controlling the printing and non-printing of any desired results derived by the operation of keys of said separately operable sets of keys, a plurality of sets of totalizers, key means for selectively controlling the actuation of said sets of totalizers, and key means for controlling the printing and non-printing of accumulations of said totalizers irrespective of the printing and non-printing positions of said first-named printing controlling key means.

22. A calculating machine comprising a keyboard, a plurality of sets of totalizers, said sets of totalizers being arranged in groups, mechanism including key means for selectively controlling the operation of one or more of said totalizers by sets, mechanism including key means for selectively controlling said totalizers by groups, and printing mechanism for printing the accumlations of said totalizers.

23. A calculating machine comprising a keyboard, a plurality of sets of totalizers, said sets of totalizers being arranged in groups, mechanism including key means for selectively controlling the operation of one or more of said totalizers by sets, mechanism including key means for selectively controlling said totalizers by groups, printing mechanism and means for printing and non-printing selectively the accumulations of said totalizers.

In testimony whereof I have signed this specification this 28th day of May, 1926.

MICHELE GUGLIELMO de SIMONE.